(12) United States Patent
Esjunin et al.

(10) Patent No.: US 10,030,910 B2
(45) Date of Patent: Jul. 24, 2018

(54) REFRACTORY ARTICLE

(71) Applicant: Saint-Gobain Ceramics & Plastics, Inc., Worcester, MA (US)

(72) Inventors: Evgeniy E. Esjunin, Dunstable, MA (US); Hubert Müller, Roedental (DE)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 627 days.

(21) Appl. No.: 14/508,798

(22) Filed: Oct. 7, 2014

(65) Prior Publication Data

US 2015/0099236 A1 Apr. 9, 2015

Related U.S. Application Data

(60) Provisional application No. 61/887,775, filed on Oct. 7, 2013.

(51) Int. Cl.
| | |
|---|---|
| *A47F 5/01* | (2006.01) |
| *F27D 5/00* | (2006.01) |
| *A47F 7/00* | (2006.01) |
| *F27D 3/00* | (2006.01) |
| *F27B 9/26* | (2006.01) |

(52) U.S. Cl.
CPC .............. *F27D 3/0021* (2013.01); *F27B 9/26* (2013.01); *F27D 5/00* (2013.01)

(58) Field of Classification Search
CPC ..... A47F 5/01; A47F 7/00; F27D 5/00; F27D 3/0021; F27D 3/0022; F27D 5/0031; C21D 9/0025; F27M 2001/1504

USPC .................. 432/253, 258, 259, 261
See application file for complete search history.

(56) References Cited

U.S. PATENT DOCUMENTS

| | | | | |
|---|---|---|---|---|
| 1,969,126 | A | * | 8/1934 | Forse .................... F27D 5/0006 |
| | | | | 432/258 |
| 2,118,641 | A | * | 5/1938 | Diamond .............. F27D 5/0006 |
| | | | | 108/102 |
| 2,434,852 | A | | 1/1948 | Jackson |
| 2,629,917 | A | | 3/1953 | Lovatt |
| 3,739,921 | A | | 6/1973 | Schmidt |

(Continued)

FOREIGN PATENT DOCUMENTS

| | | |
|---|---|---|
| CN | 101142457 A | 3/2008 |
| DE | 3301421 A1 | 7/1984 |

(Continued)

*Primary Examiner* — Alissa Tompkins
*Assistant Examiner* — Benjamin W Johnson
(74) *Attorney, Agent, or Firm* — Abel Law Group, LLP; Thomas Osborn

(57) ABSTRACT

A refractory article having a support structure including a first plurality of posts coupled by a first member; and a second plurality of posts substantially parallel with the first plurality of posts, the second plurality of posts coupled by a second member, wherein the support structure has a height, H, and wherein the first and second members are positioned between 0.3H and 0.7H. In another aspect, the support structure has a height to width ratio of at least 1.5, a stiffness factor of no greater than 100 mm, and a solid to open volume ratio of no greater than 5%. In another aspect, the support structure has a weight of no greater than 1200 kg, a stiffness factor of no greater than 100 mm, and a solid to open volume ratio of no greater than 5%.

20 Claims, 6 Drawing Sheets

(56) References Cited

U.S. PATENT DOCUMENTS

| | | | |
|---|---|---|---|
| 3,992,139 A | 11/1976 | Lovatt | |
| 4,227,874 A | 10/1980 | Nugent | |
| 4,228,902 A | 10/1980 | Schulte | |
| 4,462,798 A * | 7/1984 | Foster | F27D 3/123 432/241 |
| 4,487,579 A * | 12/1984 | Irwin | F27D 3/123 432/137 |
| 4,721,460 A | 1/1988 | Bushman et al. | |
| 4,785,151 A | 11/1988 | Voegtlin | |
| 4,836,777 A | 6/1989 | Elliott | |
| 5,168,036 A | 12/1992 | Doby, Jr. | |
| 5,667,379 A | 9/1997 | Sporer | |
| 5,785,519 A | 7/1998 | Becker et al. | |
| 5,836,760 A | 11/1998 | Turner et al. | |
| 5,848,890 A | 12/1998 | McCormick | |
| 6,454,564 B2 | 9/2002 | Ricchio et al. | |
| 6,644,966 B1 | 11/2003 | Chiang | |
| 7,384,264 B2 | 6/2008 | Ego et al. | |
| 7,765,942 B2 | 8/2010 | Choi | |
| 8,087,931 B2 | 1/2012 | Erhard | |
| 2007/0104816 A1 | 5/2007 | Woodside et al. | |
| 2008/0138754 A1 | 6/2008 | Erhard | |
| 2010/0133220 A1 | 6/2010 | Komiyama | |
| 2011/0039221 A1* | 2/2011 | Hanzawa | B28B 11/248 432/258 |

FOREIGN PATENT DOCUMENTS

| | | |
|---|---|---|
| EP | 0364201 A1 | 4/1990 |
| EP | 1197148 A2 | 4/2002 |
| EP | 0964217 B1 | 6/2003 |
| EP | 1181490 B1 | 11/2003 |
| EP | 1908350 A1 | 4/2008 |
| EP | 1382249 B1 | 7/2008 |
| EP | 2275765 B1 | 1/2012 |
| FR | 1603518 A | 5/1971 |
| JP | H10-311686 A | 11/1998 |
| JP | 2011226690 A | 11/2011 |
| WO | 2012014835 A1 | 2/2012 |

* cited by examiner

REFRACTORY ARTICLE

CROSS-REFERENCE TO RELATED APPLICATION(S)

This application claims priority under 35 U.S.C. § 119(e) to U.S. Patent Application No. 61/887,775 entitled "Refractory Article," by Evgeniy E. Esjunin, et al., filed Oct. 7, 2013, which is assigned to the current assignee hereof and incorporated herein by reference in its entirety.

FIELD OF THE DISCLOSURE

The present disclosure relates to a refractory article, and more particularly to a structurally rigid refractory article used to support and transport articles to be fired.

RELATED ART

Ceramic processing can be an involved and time consuming task, including sourcing and combining the proper components together into an initial mixture and use of one or more forming processes, such as casting, molding, pressing, spraying, and the like to give the initial mixture shape. The resulting shape is generally referred to as a green (i.e., unfinished) body. However, to transform the green body into a ceramic body, generally one or more controlled heating processes can be used to give the body the desired composition and/or microstructure. Typically, such heating processes may use considerably high temperatures, such as on the order of 1,000° C. and higher. Such heating processes can last for hours or even days.

Kiln furniture is a structural member that can be used to properly maintain a green body in a desired position during the heating processes. Kiln furniture is heated with the green body, and thus must be mechanically stable at the elevated temperatures used to form the green body into a ceramic body. Moreover, the kiln furniture may be expected to survive multiple processing cycles, and thus multiple heating and cooling processes. Loss of structural integrity can result in loss of ceramic bodies, and thus a loss in production.

The industry continues to demand improvements in kiln furniture.

BRIEF DESCRIPTION OF THE DRAWINGS

Embodiments are illustrated by way of example and are not limited in the accompanying figures.

DETAILED DESCRIPTION

Figure 1:
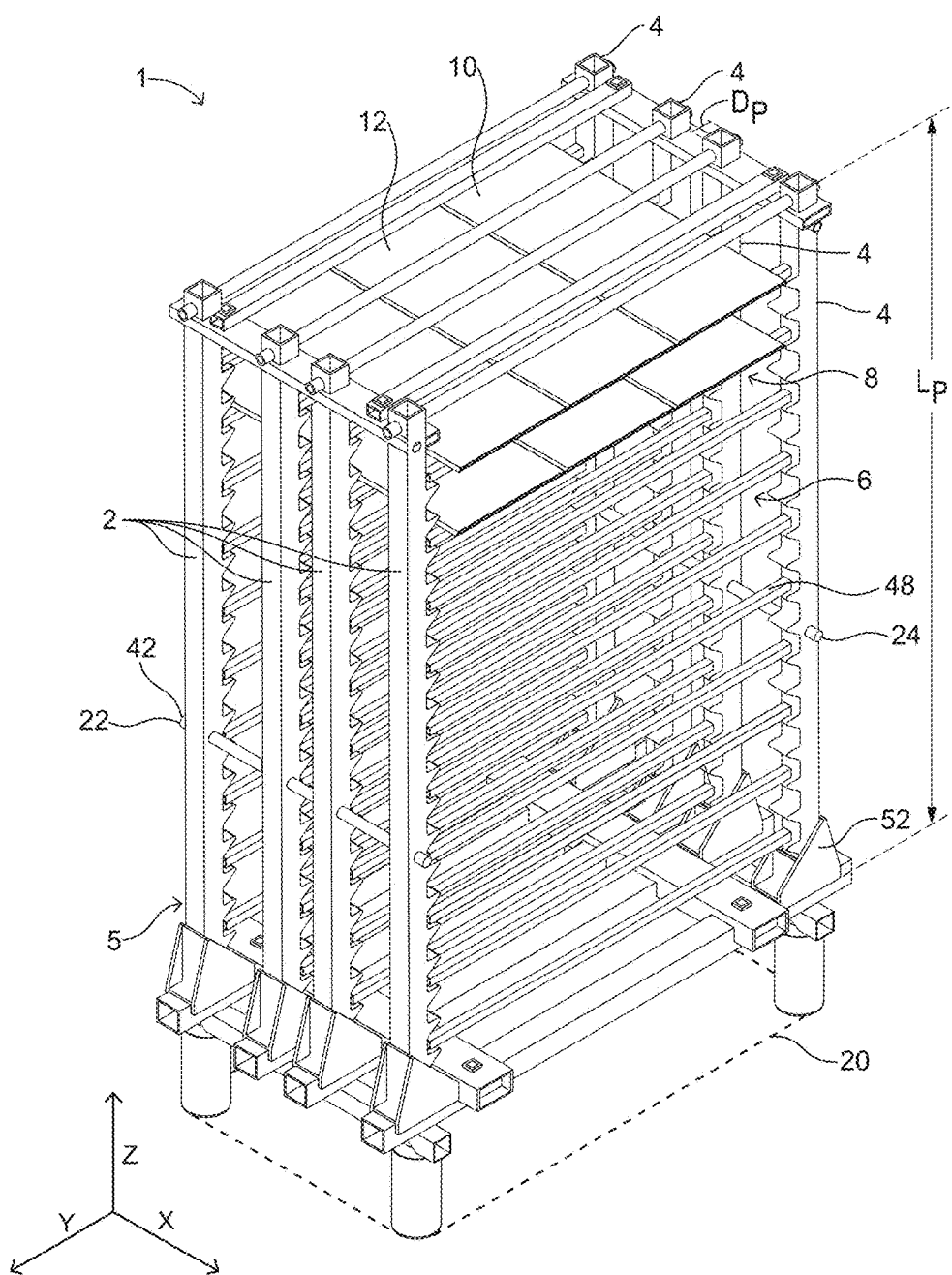
FIG. 1 includes a perspective view illustration of a refractory article in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the terms "substantially parallel" and "substantially vertical" refer to objects having a misalignment, or an offsetting angle there between, of less than 5°, such as less than 4°, less than 3°, less than 2°, or even less than 1°. For example, an object that is substantially vertical may be offset from vertical by up to 5°. Use of the term "substantially" as it relates to other characteristics of the embodiments herein refers to a value falling in a range of plus-or-minus (±) 10% of the value of that characteristic, such as ±8% of the value of that characteristic, ±6% of the value of that characteristic, ±4% of the value of that characteristic, ±3% of the value of that characteristic, ±2% of the value of that characteristic, or even ±1% of the value of that characteristic.

Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the refractory arts.

The concepts are better understood in view of the embodiments described below that illustrate and do not limit the scope of the present invention. The following description is directed to a refractory article, and particularly, to an article of kiln furniture that provides a high open volume carrying capacity while maintaining structural rigidity and integrity.

Referring initially to FIG. 1, a refractory article 1, which may be configured to function as kiln furniture and support green bodies during processing, is shown positioned in a three dimensional space defined by an X-dimension, a Y-dimension, and a Z-dimension. The X-dimension extends in a horizontal direction; the Y-dimension extends in a generally perpendicular direction to the X-dimension; and the Z-dimension extends perpendicular to both the X- and Y-dimensions. As used herein, the term "horizontal" or "substantially horizontal" is used to refer to the X- and Y-dimensions. As used herein, the term "vertical" or "substantially vertical" is used to refer to the Z-dimension.

The refractory article 1 can generally include a first plurality of posts 2 and a second plurality of posts 4. The first and second plurality of posts 2 and 4 can define an internal volume 6 therebetween into which work pieces can be received for firing.

A plurality of article supporting shelves 8 can be inserted into the internal volume 6 and can span between the first and second plurality of posts 2 and 4. Each of the plurality of article supporting shelves 8 can be further configured to include a plurality of supporting shelf sections 10 and 12.

Figure 2:
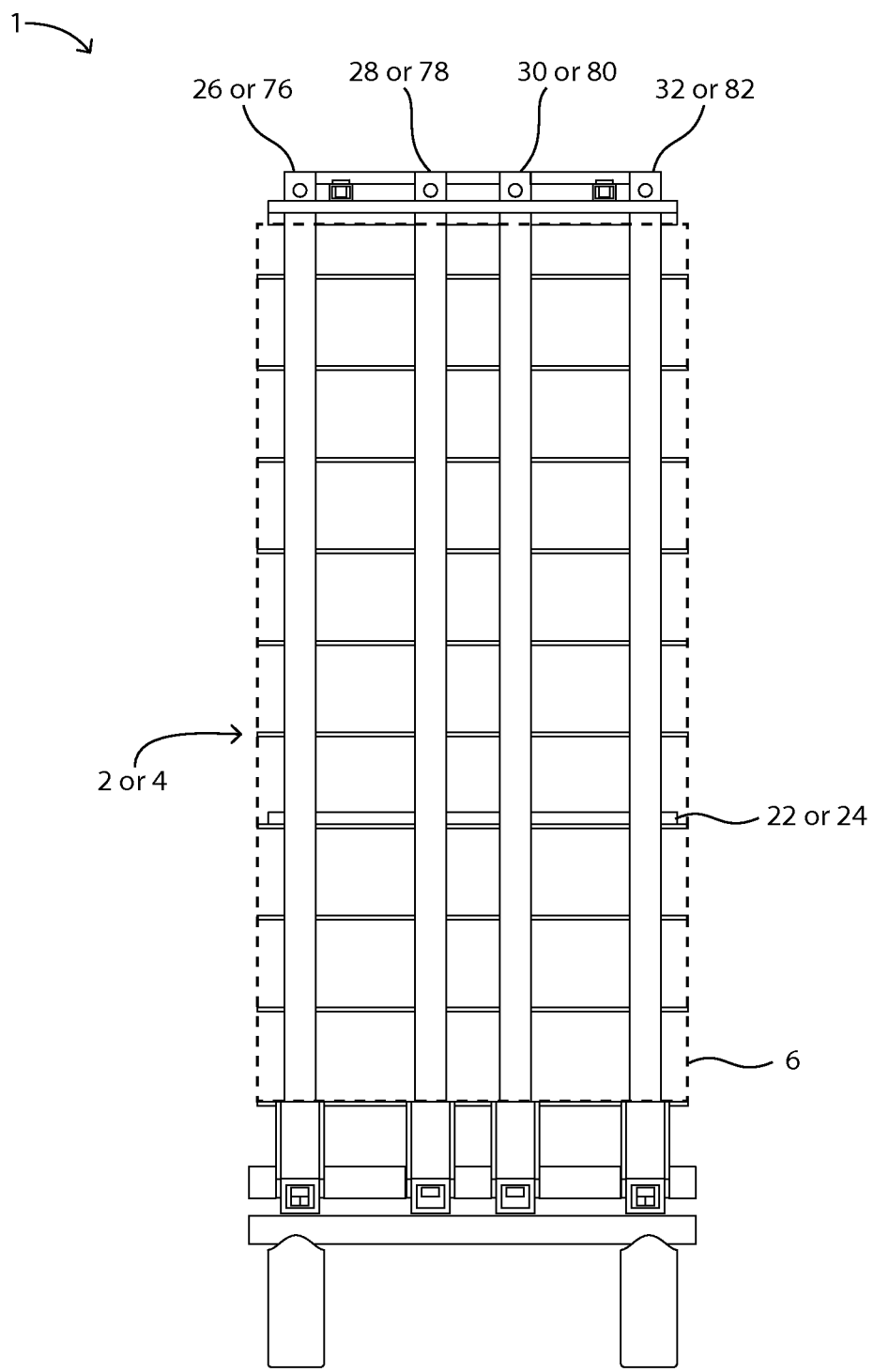
FIG. 2 includes a side view of an article of a refractory article in accordance with an embodiment.

The first and second plurality of posts 2 and 4 can each include a number of discrete posts. In particular, the first plurality of posts 2 may include 2 posts, 3 posts, 4 posts, 5 posts, 6 posts, or even 7 posts. As seen in FIG. 2, in particular embodiments, the first plurality of posts 2 can be formed from four discrete posts 26, 28, 30, 32. The four discrete posts 26, 28, 30, 32 can all have the same general geometric shape and cross-sectional profile as one another and can be formed from the same or similar material(s). Moreover, each of the four discrete posts 26, 28, 30, 32 can be aligned such that the largest dimension (i.e., the height) thereof can extend parallel, or substantially parallel, in the Z-dimension. In this regard, the first and second plurality of posts 2 and 4 may facilitate suitable mechanical characteristics in accordance with the embodiments herein.

In particular embodiments, each one of the discrete posts 26, 28, 30, 32 of the first plurality of posts 2 can have a rectilinear cross-sectional profile as viewed in the Z-dimension.

Each of the discrete posts 26, 28, 30, 32 can have a substantially hollow cross-sectional profile defined by an outer sidewall. In such a manner, each of the discrete posts 26, 28, 30, 32 can have a solid to open ratio of no less than 0.25:1, such as no less than 1:1, or even no less than 1:2. The hollow cavity within each of the discrete posts 26, 28, 30, 32 can be polygonal, ellipsoidal, or can have any other geometric shape when viewed in cross-section. Moreover, the hollow cavity within each of the discrete posts 26, 28, 30, 32 can extend the entire length of the posts 26, 28, 30, 32 or any distance less than the entire length thereof. In a particular embodiment the hollow cavity may extend completely through the length of the posts 26, 28, 30, 32 from a distal end to a terminal end thereof.

Each of the discrete posts 26, 28, 30, 32 of the first plurality of posts 2 can comprise a diameter, $D_{P1}$, as measured from opposite outer sidewalls thereof. In particular embodiments, each of the discrete posts 26, 28, 30, 32 can have a diameter, $D_{P1}$, of between 50 mm and 100 mm. In more particular embodiments, each of the discrete posts 26, 28, 30, 32 can have a diameter, $D_{P1}$, of between 80 mm and 95 mm. In yet more particular embodiments, each of the discrete posts 26, 28, 30, 32 can have a diameter, $D_{P1}$, of 90 mm. In certain embodiments, each of the discrete posts 26, 28, 30, 32 of the first plurality of posts 2 can have an equal diameter, $D_{P1}$, in both the X- and Y-dimensions.

Each of the discrete posts 26, 28, 30, 32 of the first plurality of posts 2 can further have a length, $L_{P1}$, as measured from a first end to a second end and extending in the Z-dimension. The length, $L_{P1}$, of the discrete posts 26, 28, 30, 32 can be between 2000 mm and 3000 mm. In more particular embodiments, the length, $L_{P1}$, of the discrete posts 26, 28, 30, 32 can be between 2500 mm and 2900 mm. In yet more particular embodiments, the length, $L_{P1}$, of the discrete posts 26, 28, 30, 32 can be between 2850 mm and 2900 mm.

In yet further embodiments, $L_{P1}$ can be no less than 10 $D_{P1}$, such as no less than 20 $D_P$, no less than 30 $D_{P1}$, no less than 40 $D_{P1}$, no less than 50 $D_{P1}$, no less than 60 $D_{P1}$, no less than 70 $D_{P1}$, no less than 80 $D_{P1}$, no less than 90 $D_{P1}$, or even no less than 100 $D_{P1}$. $L_{P1}$ can be no greater than 500 $D_{P1}$, such as no greater than 400 $D_{P1}$, no greater than 300 $D_{P1}$, no greater than 200 $D_{P1}$, no greater than 100 $D_{P1}$, or even no greater than 50 $D_{P1}$. Moreover, $L_{P1}$ can also be within the range between and including any of the values described above, such as, for example, between 60 $D_{P1}$ and 90 $D_{P1}$. It should be understood that each of the discrete posts 26, 28, 30, 32 can be sized to have the same length, $L_{P1}$, and the same diameter, $D_{P1}$. In alternative embodiments, at least one of the discrete posts 26, 28, 30, 32 can have a different length, $L_{P1}$, and/or different diameter, $D_{P1}$, compared to one of the other discrete posts 26, 28, 30, 32.

In particular embodiments, each of the discrete posts 26, 28, 30, 32 can be formed from a single, monolithic piece. Each of the discrete posts 26, 28, 30, 32 can be formed by a process such as, rolling, pressing, extruding, bending, forging, stamping, or any combination thereof to create a suitable shape.

In other embodiments, each of the discrete posts 26, 28, 30, 32 can be formed from several pieces that are attached together by any method recognizable in the art, such as, for example, by a weld, a threaded fastener, a non-threaded fastener (e.g., a rivet), an adhesive, a tongue and groove or similar complementary engagement structure, mechanical deformation (e.g., crimping), or any combination thereof.

The second plurality of posts 4 may have the same characteristics as the first plurality of posts 2. In this regard, the second plurality of posts 4 may include 2 posts, 3 posts, 4 posts, 5 posts, 6 posts, or even 7 posts. As seen in FIG. 1, in particular embodiments, the second plurality of posts 4 can be formed from four discrete posts 76, 78, 80, 82. The four discrete posts 76, 78, 80, 82 can all have the same geometric shape and cross-sectional profile as viewed from the X-, Y-, and Z-dimensions. Additionally, each of the four discrete posts 76, 78, 80, and 82 can be formed from the same material. Moreover, each of the four discrete posts 76, 78, 80, 82 can be aligned such that the largest dimension thereof can extend parallel, or substantially parallel, in the Z-dimension.

In particular embodiments, each of the discrete posts 76, 78, 80, 82 of the second plurality of posts 4 can have a rectilinear cross-sectional profile. Each of the discrete posts 76, 78, 80, 82 can have a substantially hollow cross-sectional profile defined by an outer sidewall. In particular embodiments, each of the discrete posts 76, 78, 80, 82 can have a solid to open ratio of no less than 0.25:1, such as no less than 1:1, or even no less than 1:2. The hollow cavity within each of the discrete posts 76, 78, 80, 82 can be polygonal, ellipsoidal, or can have any other geometric shape. Moreover, the hollow cavity within each of the discrete posts 76, 78, 80, 82 can extend the entire length of the posts 76, 78, 80, 82 or any distance less than the length of the post.

Each of the discrete posts 76, 78, 80, 82 of the second plurality of posts 4 can comprise a diameter, $D_{P2}$, as measured from opposite outer sidewalls thereof in the X- and Y-dimensions. In particular embodiments, each of the discrete posts 76, 78, 80, 82 can have a diameter, $D_{P2}$, of between 50 mm and 100 mm. In more particular embodiments, each of the discrete posts 76, 78, 80, 82 can have a diameter, $D_{P2}$, of between 80 mm and 95 mm. In yet more particular embodiments, each of the discrete posts 76, 78, 80, 82 can have a diameter, $D_{P2}$, of 90 mm. In certain embodiments, each of the discrete posts 76, 78, 80, 82 of the second plurality of posts 4 can have an equal diameter, $D_{P2}$, in both the X- and Y-dimensions.

Each of the discrete posts 76, 78, 80, 82 of the second plurality of posts 4 can further have a length, $L_{P2}$, as measured from a first end to a second end and extending in the Z-dimension. In particular embodiments, the length, $L_{P2}$, of the discrete posts 76, 78, 80, 82 can be between 2000 mm and 3000 mm. In more particular embodiments, the length, $L_{P2}$, of the discrete posts 76, 78, 80, 82 can be between 2500 mm and 2900 mm.

In yet more particular embodiments, the length, $L_{P2}$, of the discrete posts 76, 78, 80, 82 can be between 2850 mm and 2900 mm. In yet further embodiments, $L_{P2}$ can be no less than 10 $D_{P2}$, no less than 20 $D_{P2}$, no less than 30 $D_{P2}$, no less than 40 $D_{P2}$, no less than 50 $D_{P2}$, no less than 60 $D_{P2}$, no less than 70 $D_{P2}$, no less than 80 $D_{P2}$, no less than 90 $D_{P2}$, or even no less than 100 $D_{P2}$. $L_{P2}$ can be no greater than 500 $D_{P2}$, no greater than 400 $D_{P2}$, no greater than 300 $D_{P2}$, no greater than 200 $D_{P2}$, no greater than 100 $D_{P2}$, no greater than 50 $D_{P2}$. Moreover, $L_{P2}$ can also be within the range between and including any of the values described above, such as, for example, between 60 $D_{P2}$ and 90 $D_{P2}$. It should be understood that each of the discrete posts 76, 78, 80, 82 can be sized to have the same length, $L_{P2}$, and the same diameter, $D_{P2}$. In alternative embodiments, each of the discrete posts 76, 78, 80, 82 can have different lengths, $L_{P2}$, and different diameters, $D_{P2}$, relative to one another.

In particular embodiments, each of the discrete posts 76, 78, 80, 82 can be formed from a single, monolithic piece shaped to a desired specification. In this regard, each of the discrete posts 76, 78, 80, 82 can be rolled, pressed, extruded, bent, forged, stamped, or acted upon in any other manner so as to create a suitable shape.

In other embodiments, each of the discrete posts 76, 78, 80, 82 can be formed from several pieces that are attached together by any method recognizable in the art, such as, for example, by a weld, a threaded fastener, a non-threaded fastener (e.g., a rivet), an adhesive, a tongue and groove or similar complementary engagement structure, mechanical deformation (e.g., crimping), or any combination thereof.

The first and second plurality of posts 2 and 4 can be arranged within the X- and Y-dimensions. In this regard, the first and second plurality of posts 2 and 4 define a base footprint 20 which can be positioned in a plane in the X- and Y-dimensions such that the first and second plurality of posts 2 and 4 extend therefrom (i.e. the length of the first and second plurality of posts 2 and 4) in the Z-dimension.

The refractory article 1 may further include members connected to the first and second plurality of posts 2 and 4 to facilitate suitable mechanical characteristics of embodiments of the refractory article 1 herein. In particular embodiments, the first plurality of posts 2 can be interconnected by a first member 22 and the second plurality of posts 4 can be interconnected by a second member 24.

The first and second members 22 and 24 may have particular dimensions to facilitate suitable mechanical characteristics of the embodiments herein. For example, the first member 22 can have a length, $L_{M1}$, as defined by the longest dimension thereof and as extending in the X-dimension as shown in FIG. 1. In particular embodiments, the length, $L_{M1}$, can be between 1000 mm and 1400 mm. In more particular embodiments, the length, $L_{M1}$, can be between 1100 mm and 1200 mm. In yet more particular embodiments, the first member 22 can have a length, $L_{M1}$, of between 1150 mm and 1170 mm.

The first member 22 can also have a diameter, $D_{M1}$. The diameter, $D_{M1}$, can define a dimension of the first member 22 extending through the body of the first member 22 in a direction generally perpendicular to the length, $L_{M1}$, such as in the Y-dimension as shown in FIG. 1. The diameter may be one dimension used to define the cross-sectional shape of the first member 22 In particular embodiments, the diameter, $D_{M1}$, can be between 5 mm and 75 mm. In more particular embodiments, the diameter, $D_{M1}$, can be between 35 mm and 45 mm. In yet more particular embodiments, the first member 22 can have a diameter, $D_{M1}$, of 40 mm.

According to one embodiment, the first member 22 may have a particular relationship between the length and the diameter to facilitate suitable mechanical characteristics according to the embodiments. For example, the first member 22 can have a length $L_{M1}$, which can be at least 10 times the length of the diameter (i.e., 10 $D_{M1}$). Yet, in another embodiment the length, $L_{M1}$, can be at least 15 $D_{M1}$, at least 20 $D_{M1}$, at least 25 $D_{M1}$, at least 30 $D_{M1}$, at least 35 $D_{M1}$, at least 40 $D_{M1}$, at least 45 $D_{M1}$, or even at least 50 $D_{M1}$. In particular embodiments, $L_{M1}$ can be no greater than 500 $D_{M1}$, no greater than 450 $D_{M1}$, no greater than 400 $D_{M1}$, no greater than 350 $D_{M1}$, no greater than 300 $D_{M1}$, no greater than 250 $D_{M1}$, no greater than 200 $D_{M1}$, or even no greater than 150 $D_{M1}$. Moreover, in further embodiments, $L_{M1}$ can also be within a range of between and including any of the above described values, such as, for example, between 15 $D_{M1}$ and 25 $D_{M1}$.

The second member 24 may also have particular dimensions to facilitate suitable mechanical characteristics of the embodiments herein. In this regard, the second member 24 can have any of the attributes of the first member 22. For example, the second member 24 can have a length, $L_{M2}$, as defined by the longest dimension thereof and as extending in the X-dimension as shown in FIG. 1. In particular embodiments, the length, $L_{M2}$, can be between 1000 mm and 1400 mm. In more particular embodiments, the length, $L_{M2}$, can be between 1100 mm and 1200 mm. In yet more particular embodiments, the second member 24 can have a length, $L_{M2}$, of between 1150 mm and 1170 mm.

The second member 24 can also have a diameter, $D_{M2}$. The diameter, $D_{M2}$, can define a dimension of the second member 24 extending through the body of the second member 24 in a direction generally perpendicular to the length, $L_{M2}$, such as in the Y-dimension as shown in FIG. 1. The diameter may be one dimension used to define the cross-sectional shape of the second member 22. In particular embodiments, the diameter, $D_{M2}$, can be between 5 mm and 75 mm. In more particular embodiments, the diameter, $D_{M2}$, can be between 35 mm and 45 mm.

Moreover, in particular embodiments, the second member 24 can have a length $L_{M2}$, which can be at least 10 times the length of the diameter (i.e., 10 $D_{M2}$). Yet, in another embodiment the length, $L_{M2}$, can be at least 15 $D_{M2}$, at least 20 $D_{M2}$, at least 25 $D_{M2}$, at least 30 $D_{M2}$, at least 35 $D_{M2}$, at least 40 $D_{M2}$, at least 45 $D_{M2}$, or even at least 50 $D_{M2}$. In particular embodiments, $L_{M2}$ can be no greater than 500 $D_{M2}$, no greater than 450 $D_{M2}$, no greater than 400 $D_{M2}$, no greater than 350 $D_{M2}$, no greater than 300 $D_{M2}$, no greater than 250 $D_{M2}$, no greater than 200 $D_{M2}$, or even no greater than 150 $D_{M2}$. Moreover, in further embodiments, $L_{M2}$ can also be within a range of between and including any of the above described values, such as, for example, between 75 $D_{M2}$ and 125 $D_{M2}$.

In particular embodiments, the first member 22 can be substantially hollow and can define an internal cavity. In this regard, the first member 22 can provide the first plurality of posts 2 with structural stability while minimizing weight of the refractory article 1. Specifically, the first member 22 can have a solid to open ratio of no less than 0.5:1, such as no less than 1:1, or even no less than 1:2. The internal cavity within the first member 22 can define an inner wall that can be polygonal, ellipsoidal, or any combination thereof. Moreover, the internal cavity within the first member 22 can extend along the entire length of the first member 22 or any distance thereunder. It should be understood that as contemplated herein the internal cavity can vary in shape and size within the first member 22.

To further enhance structural rigidity of the refractory article 1, the first member 22 can be formed from a single, monolithic piece. In such a manner, the first member 22 can have enhanced structural properties and strengths and can be devoid of seams and joints which can introduce structural weakness into the refractory article 1.

Similar to the first member 22, the second member 24 can be substantially hollow and can define an internal cavity. In this regard, the second member 24 can provide the second plurality of posts 4 with structural stability while minimizing the weight of the refractory article 1. Specifically, the second member 24 can have a solid to open ratio of no less than 0.5:1, such as no less than 1:1, or even no less than 1:2. The internal cavity within the second member 24 can define an inner wall that can be polygonal, ellipsoidal, or any combination thereof. Moreover, the internal cavity within the second member 24 can extend along the entire length of the second member 24 or any distance thereunder. It should be understood that as contemplated herein the internal cavity of the second member 24 can vary in shape and size within the second member 24.

To further enhance structural rigidity of the refractory article 1, the second member 24 can be formed from a single, monolithic piece. In such a manner, the second member 24 can have enhanced structural properties and strengths and can be devoid of seams and joints which can introduce a structural weakness into the refractory article 1.

In particular embodiments, the first and second members 22 and 24 can have the same size and shape. Moreover, the first and second members 22 and 24 can be formed from the same material and in the same manner. In this regard, the first and second members 22 and 24 can be interchangeable. In such a manner, $L_{M1}$ can be equal to $L_{M2}$ and $D_{M1}$ can be equal to $D_{M2}$.

In further embodiments, each of the first and second plurality of posts 2 and 4 can have a diameter, $D_P$, that is less than the diameter, $D_M$, of each of the first and second members 22 and 24. In particular embodiments, the first member 22 can have a diameter, $D_{M1}$, that is less than 0.95 $D_{P1}$, such as less than 0.90 $D_{P1}$, less than 0.85 $D_{P1}$, less than 0.80 $D_{P1}$, less than $0.7_5$ $D_{P1}$, less than 0.70 $D_{P1}$, less than 0.65 $D_{P1}$, less than 0.60 $D_{P1}$, less than 0.50 $D_{P1}$, or even less than 0.40 $D_{P1}$. In particular embodiments, $D_{P1}$ can be no less than 0.10 $D_{M1}$, such as no less than 0.15 $D_{M1}$, no less than 0.20 $D_{M1}$, or even no less than 0.30 $D_{M1}$. Moreover, $D_{M1}$ can be within a range of between and including any of the values described above, such as, for example, between 0.40 $D_{P1}$ and 0.55 $D_{P1}$.

Similarly, the second member 24 can have a diameter, $D_{M2}$, that is less than 0.95 the diameter, $D_{P2}$, of one of the second plurality of posts 4, such as less than 0.90 $D_{P2}$, less than 0.85 $D_{P2}$, less than 0.80 $D_{P2}$, less than $0.7_5$ $D_{P2}$, less than 0.70 $D_{P2}$, less than 0.65 $D_{P2}$, less than 0.60 $D_{P2}$, less than 0.50 $D_{P2}$, or even less than 0.40 $D_{P2}$. $D_{P2}$ can be no less than 0.10 $D_{M2}$, such as no less than 0.15 $D_{M2}$, no less than 0.20 $D_{M2}$, or even no less than 0.30 $D_{M2}$. Moreover, $D_{M2}$ can be within a range of between and including any of the values described above, such as, for example, between 0.40 $D_{P2}$ and 0.55 $D_{P2}$.

Each of the first and second plurality of posts 2 and 4 can have a length that is less than each of the first and second members 22 and 24. In particular embodiments, the first member 22 can have a length, $L_{P1}$, that can be no less than 1.1 $L_{M1}$, such as no less than 1.2 $L_{M1}$, no less than 1.3 $L_{M1}$, no less than 1.4 $L_{M1}$, no less than 1.5 $L_{M1}$, no less than 2.0 $L_{M1}$, or no less than 2.5 $L_{M1}$. $L_{P1}$ can be no greater than 4.0 $L_{M1}$, such as no greater than 3.75 $L_{M1}$, no greater than 3.5 $L_{M1}$, or no greater than 3.25 $L_{M1}$. Moreover, $L_{P1}$ can also be within a range between and including any of the values described above, such as, for example, between 3.5 $L_{M1}$ and 4.0 $L_{M1}$.

The second member 24 can have a length, $L_{P2}$, that can be no less than 1.1 $L_{M2}$, such as no less than 1.2 $L_{M2}$, no less than 1.3 $L_{M2}$, no less than 1.4 $L_{M2}$, no less than 1.5 $L_{M2}$, no less than 2.0 $L_{M2}$, or no less than 2.5 $L_{M2}$. $L_{P2}$ can be no greater than 4.0 $L_{M2}$, such as no greater than 3.75 $L_{M2}$, no greater than 3.5 $L_{M2}$, or no greater than 3.25 $L_{M2}$. Moreover, $L_{P2}$ can be within a range between and including any of the values described above, such as, for example, between 3.5 $L_{M2}$ and 4.0 $L_{M2}$.

Figure 3:
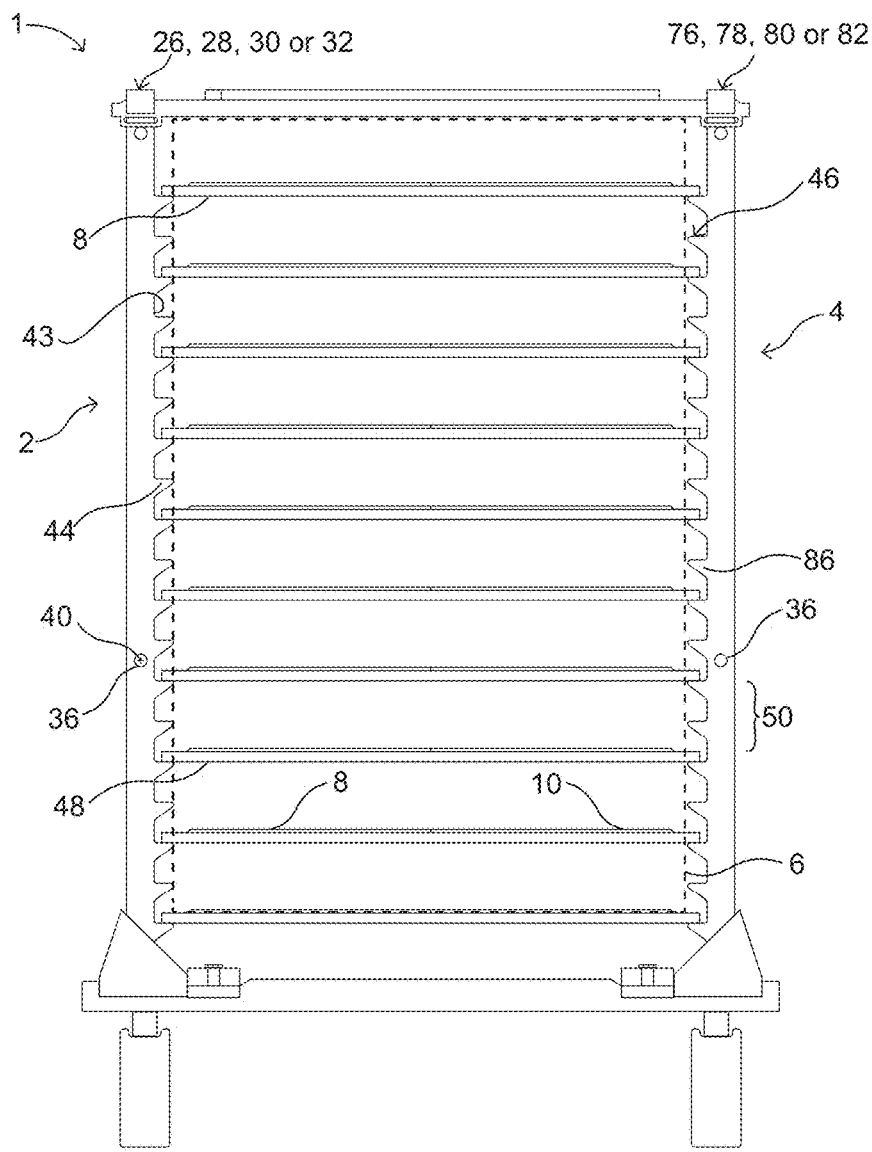
FIG. 3 includes a side view of an article of a refractory article in accordance with an embodiment.

As illustrated in FIG. 3, each of the discrete posts 26, 28, 30, 32 of the first plurality of posts 2 can have an aperture 36 extending there through in the X-dimension, as shown in FIG. 1. The apertures 36 can have a generally cylindrical shape with a diameter, $D_A$. Moreover, the apertures 36 can each define a central axis that can form a coaxial plurality of openings in the X-dimension between each of the discrete posts 26, 28, 30, 32. In this regard, the discrete posts 26, 28, 30, 32 can be aligned such that the apertures 36 are in open axial communication to facilitate easier assembly and positioning of the first member 22 within the first plurality of posts 2.

Similarly, each of the discrete posts 76, 78, 80, 82 of the second plurality of posts 4 can have an aperture 36 extending there through in the X-dimension, as shown in FIG. 1. The apertures 36 can have a generally cylindrical shape with a diameter, $D_A$. Moreover, the apertures 36 can each define a central axis that can form a coaxial plurality of openings in the X-dimension between each of the discrete posts 76, 78, 80, 82. In this regard, the discrete posts 76, 78, 80, 82 can be aligned such that the apertures 36 are in open axial communication. Such alignment can facilitate easier assembly and positioning of the second member 24 within the second plurality of posts 4.

Figure 4:
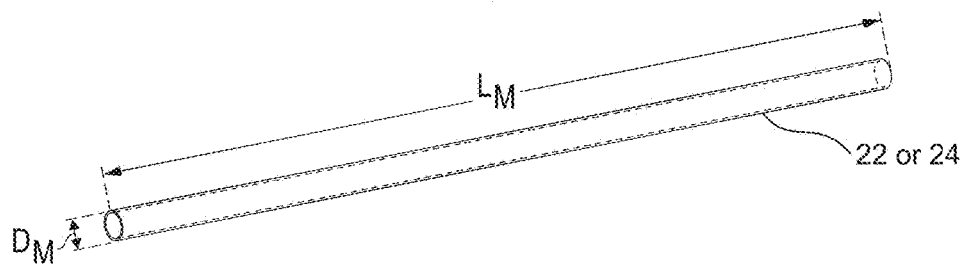
FIG. 4 includes a perspective view of a support member in accordance with an embodiment.

In particular embodiments, the diameter, $D_{M1}$, of the first member 22, as seen in FIG. 4, can be less than the diameter, $D_A$, of the apertures 36. For example, $D_M$ can be less than 0.999 $D_A$, less than 0.998 $D_A$, less than 0.997 $D_A$, less than 0.996 $D_A$, less than 0.995 $D_A$, less than 0.98 $D_A$, less than 0.97 $D_A$, less than 0.96 $D_A$, less than 0.95 $D_A$, less than 0.90

$D_A$, or even less than 0.85 $D_A$. In particular embodiments, $D_{M1}$ can be no less than 0.6 $D_A$, no less than 0.7 $D_A$, no less than 0.8 $D_A$, or no less than 0.9 $D_A$. Moreover, $D_{M1}$ can be within a range between and including any of the values described above, such as, for example, between 0.92 $D_A$ and 0.97 $D_A$.

While having a relatively larger aperture 36 can allow for a larger support member 22 to be used within the first plurality of posts 2, a relatively large aperture 36 can also diminish the effective stiffness and rigidity of the refractory article 1 by introducing unnecessary radial play within the first plurality of posts 2. In this regard, in a more preferred embodiment, $D_M$ can be within a range of between 0.95 $D_A$ and 0.998 $D_A$.

Similarly, the diameter, $D_{M2}$, of the second member 24 can be less than the diameter, $D_A$, of the apertures 36. For example, $D_{M2}$ can be less than 0.999 $D_A$, less than 0.998 $D_A$, less than 0.997 $D_A$, less than 0.996 $D_A$, less than 0.995 $D_A$, less than 0.98 $D_A$, less than 0.97 $D_A$, less than 0.96 $D_A$, less than 0.95 $D_A$, less than 0.90 $D_A$, or even less than 0.85 $D_A$. In particular embodiments, $D_{M2}$ can be no less than 0.6 $D_A$, no less than 0.7 $D_A$, no less than 0.8 $D_A$, or no less than 0.9 $D_A$. Moreover, $D_{M2}$ can be within a range between and including any of the values described above, such as, for example, between 0.92 $D_A$ and 0.97 $D_A$. In a more preferred embodiment, $D_{M2}$ can be within a range of between 0.95 $D_A$ and 0.998 $D_A$.

In particular embodiments, at least one of the first and second members 22 and 24 can freely float within its respective aperture 36. As used herein, "freely float" refers to a condition where the first or second member 22 or 24 is not secured to the aperture 36 but instead permitted to move therein. In such a manner, the first and second members 22 and 24 can longitudinally translate or rotate within the apertures 36. This may enhance structural stability of the refractory article 1. This may also allow for suitable bending and compensation when loaded.

Referring again to FIG. 1, in particular embodiments, the first and second members 22 and 24 can be positioned within the apertures 36 of the first and second plurality of posts 2 and 4 with overhanging end sections 42. The overhanging end section 42 of the first member 22 can have an overhang length, $L_O$, as defined by the length the first member 22 extends beyond the first outer post 26 in the X-dimension when the first member 22 is centered within the first plurality of posts 2 (i.e., $L_O$ is equal on both sides of the first plurality of posts 2). In particular embodiments, $L_O$ can be less than 0.20 $L_P$, less than 0.15 $L_P$, less than 0.10 $L_P$, less than 0.09 $L_P$, less than 0.08 $L_P$, less than 0.07 $L_P$, less than 0.06 $L_P$, or even less than 0.05 $L_P$. In further embodiments, $L_O$ can be greater than 0.01 $L_P$, greater than 0.02 $L_P$, greater than 0.03 $L_P$, greater than 0.04 $L_P$, greater than 0.05 $L_P$, greater than 0.06 $L_P$, greater than 0.07 $L_P$, greater than 0.08 $L_P$, greater than 0.09 $L_P$, or even greater than 0.10 $L_P$. Moreover, $L_O$ can be within the range between and including any of the values described above, such as, for example, between 0.02 $L_P$ and 0.11 $L_P$.

The second member 24 can also have an overhang length, $L_O$, as defined by the length the second member 24 extends beyond the first outer post 76 in the X-dimension when the second member 24 is centered within the second plurality of posts 4 (i.e., $L_O$ is equal on both sides of the second plurality of posts 4). In particular embodiments, $L_O$ can be less than 0.20 $L_P$, less than 0.15 $L_P$, less than 0.10 $L_P$, less than 0.09 $L_P$, less than 0.08 $L_P$, less than 0.07 $L_P$, less than 0.06 $L_P$, or even less than 0.05 $L_P$. In further embodiments, $L_O$ can be greater than 0.01 $L_P$, greater than 0.02 $L_P$, greater than 0.03 $L_P$, greater than 0.04 $L_P$, greater than 0.05 $L_P$, greater than 0.06 $L_P$, greater than 0.07 $L_P$, greater than 0.08 $L_P$, greater than 0.09 $L_P$, or even greater than 0.10 $L_P$. Moreover, $L_O$ can be within the range between and including any of the values described above, such as, for example, between 0.12 $L_P$ and 0.19 $L_P$.

The first and second plurality of posts 2 and 4 can be formed from a nitrogen bonded silicon carbide, such as, for example, N-DURANCE® as created by Saint-Gobain Cermaics & Plastics, Inc. N-DURANCE® exhibits a high modulus of rupture at room temperature and has a high modulus of elasticity upon loading. In particular, N-DURANCE® has a modulus of rupture of 175 MPa at room temperature and 180 MPa at 1450° C., a modulus of elasticity of 240 GPa, and a coefficient of thermal expansion of $4.4 \times 10^{-6}$/° C. Moreover, N-DURANCE® can withstand repeated operation at temperatures in excess of 1400° C., such as those temperatures encountered in refractory furnaces.

In particular embodiments, the first member 22 can be formed from a nitrogen bonded silicon carbide, such as, for example, N-DURANCE®. In other embodiments, the first member 22 can be formed from a nitrogen bonded silicon carbide such as HEXALOY®. HEXALOY® exhibits a compressive strength at room temperature of 3900 megapascals (MPa), a modulus of elasticity at room temperature of 410 gigapascals (GPa) and a coefficient of thermal expansion between room temperature and 700° C. of $4.02 \times 10^{-6}$ mm/mm° C. It should be understood that the use of HEXALOY® can provide the refractory article 1 with enhanced structural stiffness as compared to other known nitrogen bonded silicon carbide materials. However, it is noted that components formed from HEXALOY® may be required extrusion, and thus may not be suitable for use in the refractory article 1.

In other embodiments, the first member 22 can be formed from a material having a compressive strength at room temperature (i.e., at 22° C.) of no less than 240 MPa, such as no less than 275 MPa, no less than 300 MPa, no less than 350 MPa, no less than 400 MPa, no less than 450 MPa, no less than 500 MPa, no less than 550 MPa, or even no less than 600 MPa. Additionally, the first member 22 can be formed from a material having a modulus of elasticity at room temperature of no less than 300 GPa, no less than 350 GPa, or even no less than 400 GPa. Moreover, the first member 22 can be formed from a material adapted to withstand temperatures of at least 1400° C., at least 1500° C., at least 1600° C., at least 1700° C., at least 1800° C., or even at least 1900° C.

The second member 24 may also have particular dimensions to facilitate suitable mechanical characteristics of the embodiments herein. In this regard, the second member 24 can have any of the attributes of the first member 22. For example, the second member 24 can be formed from N-DURANCE®, HEXALOY®, or any combination thereof.

Alternatively, the second member 24 can be formed from any other material having a compressive strength at room temperature of no less than 240 MPa, such as no less than 275 MPa, no less than 300 MPa, no less than 350 MPa, no less than 400 MPa, no less than 450 MPa, no less than 500 MPa, no less than 550 MPa, or even no less than 600 MPa. Additionally, the second member 24 can be formed from a material having a modulus of elasticity at room temperature of no less than 300 GPa, no less than 350 GPa, or even no less than 400 GPa. Moreover, the second member 24 can be formed from a material adapted to withstand temperatures of at least 1400° C., at least 1500° C., at least 1600° C., at least 1700° C., at least 1800° C., or even at least 1900° C.

Referring again to FIG. 3, each of the discrete posts 26, 28, 30, 32 of the first plurality of posts 2 can have an inner surface 43 including a plurality of notches 44. The notches 44 can extend from the discrete posts 26, 28, 30, 32 of the first plurality of posts 2 towards the discrete posts 76, 78, 80, 82 of the second plurality of posts 4.

In particular embodiments, the notches 44 can extend perpendicular from the discrete posts 26, 28, 30, 32 a maximum distance of no less than 5 mm, such as no less than 10 mm, no less than 15 mm, no less than 20 mm, no less than 30 mm, no less than 40 mm, no less than 50 mm, no less than 75 mm, or even no less than 100 mm. In particular embodiments, the notches 44 can extend from the discrete posts 26, 28, 30, 32 a maximum distance of no greater than 300 mm, no greater than 250 mm, no greater than 200 mm, no greater than 150 mm, or even no greater than 125 mm.

Similarly, the discrete posts 76, 78, 80, 82 of the second plurality of posts 4 can have an inner surface 84 including a plurality of notches 86. The notches 86 can extend from the discrete posts 76, 78, 80, 82 of the second plurality of posts 4 towards the discrete posts 26, 28, 30, 32 of the first plurality of posts 2.

In particular embodiments, the notches 86 can extend perpendicular from the discrete posts 76, 78, 80, 82 a maximum distance of no less than 5 mm, such as no less than 10 mm, no less than 15 mm, no less than 20 mm, no less than 30 mm, no less than 40 mm, no less than 50 mm, no less than 75 mm, or even no less than 100 mm. In particular embodiments, the notches 86 can extend from the discrete posts 76, 78, 80, 82 a maximum distance of no greater than 300 mm, no greater than 250 mm, no greater than 200 mm, no greater than 150 mm, or even no greater than 125 mm.

The notches 44 located along the first plurality of posts 2 can be positioned at the same relative height as the notches 86 located along the second plurality of posts 4. In this regard, the notches 44 and 86 can form an internal support structure to support each of the article supporting shelves 8. To enhance rigidity of the refractory article, an upper surface 46 of each notch 44 and 86 can be at least partially flattened such that the upper surface 46 extends perpendicular to the corresponding one of the discrete posts 26, 28, 30, 32, and 76, 78, 80, 82. In this regard, the notches 44 and 86 can provide a stable support surface for the article supporting shelves 8.

In particular embodiments, each of the discrete posts 26, 28, 30, 32, and 76, 78, 80, 82 of the first and second plurality of posts 2 and 4 can include at least 2 notches, at least 5 notches, at least 6 notches, at least 7 notches, at least 8 notches, at least 9 notches, or even at least 10 notches. In particular embodiments, each discrete post 26, 28, 30, 32, and 76, 78, 80, 82 can include no more than 25 notches, no more than 24 notches, no more than 23 notches, no more than 22 notches, no more than 21 notches, or even no more than 20 notches. Moreover, each of the discrete posts 26, 28, 30, 32, and 76, 78, 80, 82 can contain any number of notches 44 and 86, respectively, that is within a range between and including any of the values described above.

Supported between the upper surfaces 46 of opposite notches 44 and 86 (i.e., a notch 44 on one of the discrete posts 26, 28, 30, 32 of the first plurality of posts 2 and a corresponding notch 86 on one of the discrete posts 76, 78, 80, 82 of the second plurality of posts 4) can be positioned a support member 48. Each support member 48 can have a rectilinear cross-sectional profile defining four side surfaces. One of the four side surface of each support member 48 can be positioned on an upper surface 46 of one of the notches 44 of the first plurality of posts 2 and one of the notches 86 of the second plurality of posts 4.

Each support member 48 may have particular dimensions to facilitate suitable mechanical characteristics of the embodiments herein. For example, each support member 48 can have a length, $L_{SM}$, as defined by the longest dimension thereof and as extending in the Y-dimension as shown in FIG. 1. In particular embodiments, the length, $L_{SM}$, can be between 1000 mm and 2000 mm. In more particular embodiments, the length, $L_{SM}$, can be between 1500 mm and 1800 mm. In yet more particular embodiments, the support member 48 can have a length, $L_{SM}$, of between 1700 mm and 1750 mm.

The support member 48 can also have a diameter, $D_{SM}$. The diameter, $D_{SM}$, can define a dimension of the support member 48 extending through the body of the support member 48 in a direction generally perpendicular to the length, $L_{SM}$, such as in the X-dimension as shown in FIG. 1. The diameter may be one dimension used to define the cross-sectional shape of the support member 48. In particular embodiments, the diameter, $D_{SM}$, can be between 5 mm and 75 mm. In more particular embodiments, the diameter, $D_{SM}$, can be between 25 mm and 35 mm. In yet more particular embodiments, the support member 48 can have a diameter, $D_{SM}$, of 32 mm.

According to one embodiment, the support member 48 may have a particular relationship between the length and the diameter to facilitate suitable mechanical characteristics according to the embodiments. For example, the support member 48 can have a length $L_{SM}$, which can be at least 10 times the length of the diameter (i.e., 10 $D_{SM}$). Yet, in another embodiment the length, $L_{SM}$, can be at least 15 $D_{SM}$, at least 20 $D_{SM}$, at least 25 $D_{SM}$, at least 30 $D_{SM}$, at least 35 $D_{SM}$, at least 40 $D_{SM}$, at least 45 $D_{SM}$, or even at least 50 $D_{SM}$. In particular embodiments, $L_{SM}$ can be no greater than 500 $D_{SM}$, no greater than 450 $D_{SM}$, no greater than 400 $D_{SM}$, no greater than 350 $D_{SM}$, no greater than 300 $D_{SM}$, no greater than 250 $D_{SM}$, no greater than 200 $D_{SM}$, or even no greater than 150 $D_{SM}$. Moreover, in further embodiments, $L_{SM}$ can also be within a range of between and including any of the above described values, such as, for example, between 15 $D_{SM}$ and 25 $D_{SM}$.

Each of the support members 48 can extend substantially (i.e., at least 90%) across the internal volume 6 and engage a first discrete post 26, 28, 30, 32 of the first plurality of posts 2 and a second discrete post 76, 78, 80, 82 of the second plurality of posts 4. To further enhance stability, each support member 48 can be secured to at least one of the notches 44 and 86. In this regard, the support members 48 can be attached to the notches 44 and 86 by any method recognizable in the art, such as, for example, by a weld, a threaded fastener, a non-threaded fastener (e.g., a rivet), an adhesive, a tongue and groove or similar complementary engagement structure, mechanical deformation (e.g., crimping), or any combination thereof.

In particular embodiments, each of the support members 48 can comprise a nitrogen bonded silicon carbide, such as, for example, N-DURANCE®, HEXALOY®, or any combination thereof.

Each support member 48 can be adapted to support a plurality of article supporting shelves 8. Specifically, each article supporting shelf 8 can be supported by at least two adjacent support members 48. This can effectively create a plurality of discrete support levels 50, each defined by an article supporting shelf 8.

Each of the article supporting shelves 8 can comprise multiple article supporting shelf sections 10 and 12 to facilitate easier manipulation, rearrangement, and adjustment. This can allow each article supporting shelf 8 to be adjusted as necessary to permit optimal arrangement of work pieces thereupon. For example, an article support shelf 8 can be formed from one article supporting shelf section 10 but no adjacent article supporting shelf section 12. In such a manner, articles of varying height can be more easily positioned within the refractory article, thus optimizing the work piece arrangement in the refractory article 1 to maximize and efficiently utilize the internal volume 6 thereof.

In particular embodiments, each article supporting shelf 8 can be formed from between 1 and 20 article supporting shelf sections 10. In more particular embodiments, each article supporting shelf 8 can be formed from between 4 and 10 article supporting shelf sections. In even more particular embodiments, each article supporting shelf can be formed from between 6 and 8 article supporting shelf sections 10. The article supporting shelf sections 8 can be arranged along the support members in any combination or geometric pattern to create a support level 50. Moreover, each of the article supporting shelf sections 10 can comprise a unique shape, size, thickness, material, or configuration.

In particular embodiments, each support level 50 of the refractory article can be adapted to support at least 150 Kg, at least 175 Kg, at least 200 Kg, at least 215 Kg, or even at least 230 Kg. When operated with ten support levels 50, the refractory article 1 can safely support at least 1500 Kg, at least 1750 Kg, at least 2000 Kg, at least 2150 Kg, or even at least 2300 Kg. Of course, the refractory article 1 can be adapted to support a total weight (i.e., with ten support levels) of between and including any of the values described above, such as, for example, between 1800 Kg and 1850 Kg.

Referring again to FIG. 1, the refractory article 1 can have a height to width ratio, as defined by a ratio of the height of the refractory article 1 in the Z-dimension to the width of the refractory article 1 as defined by the Y-dimension, of at least 1.5:1, at least 1.55:1, at least 1.60:1, at least 1.65:1, at least 1.70:1, at least 1.75:1, at least 1.80:1, at least 1.85:1, at least 1.90:1, at least 1.95:1, at least 2.00:1, at least 2.10:1, at least 2.20:1, at least 2.30:1, at least 2.40:1, or even at least 2.50:1. In particular embodiments, the height to width ratio can be no greater than 4.00:1, no greater than 3.75:1, no greater than 3.50:1, no greater than 3.25:1, no greater than 3.00:1, no greater than 2.75:1, no greater than 2.50:1. Moreover, the height to width ratio can be within a value between and including any of the values described above, such as, for example, between 1.95:1 and 2.40:1. It should be understood that as the ratio of the height to width increases, the center of gravity of the refractory article 1 becomes further removed from the ground, thus increasing the propensity of the refractory article to bend or fall during operation and transport.

In particular embodiments, the refractory article 1 can have a solid to open ratio, as defined by the usable inner volume 6 as compared to the volume of the components used to create the refractory article 1, of no greater than 15%, no greater than 10%, no greater than 9%, no greater than 8%, no greater than 7%, no greater than 6%, no greater than 5%, no greater than 4%, or even no greater than 3%.

As the solid to open ratio decreases, the volumetric carrying capacity of the refractory article 1 (i.e., the volumetric space into which work pieces that can be inserted) can increase relative to the weight of the components of the refractory article 1. Because refractory articles are transported to and from the kiln furnace by machines having a maximum weight capacity (e.g., forklifts), a lower solid to open ratio can allow greater volumetric carrying capacity. Accordingly, in particular embodiments, the refractory article 1 can have a usable volumetric carrying capacity of no less than 4 m$^2$, no less than 4.5 m$^2$, no less than 5.0 m$^2$, no less than 5.5 m$^2$, or even no less than 6.0 m$^2$.

To prevent the refractory article 1 from failing (e.g., plastic deformation, cracking, sagging, or failure to permit repeatable usage), the first member 22 can be positioned between the discrete posts 26, 28, 30, 32 of the first plurality of posts 2 and the second member 24 can be positioned between the discrete posts 76, 78, 80, 82 of the second plurality of posts 4. As seen in FIG. 2, the first member 22 can extend through each of the discrete posts 26, 28, 30, 32 at a relative height thereof. As previously described, each of the discrete posts 26, 28, 30, 32 can have a height, H, as defined by the distance the discrete posts 26, 28, 30, 32, extend in the Z-dimension. In particular embodiments the first member 22 can be positioned along the discrete posts 26, 28, 30, 32 at a height of between 0.3H and 0.7H.

Moreover, in particular embodiments, the discrete posts 26, 28, 30, 32 can be devoid of any other members spanning there between at a height of between 0.01H and 0.3 H and at a height of between 0.7H and 1H. In this regard, the first member 22 can tie the discrete posts 26, 28, 30, 32 of the first plurality of posts 2 together and allow for the transmission and sharing of radial deflection and forces there between. This can enhance the structural integrity of the refractory article 1 and can increase structural stiffness.

Similar to the first plurality of posts 2, the second member 24 can extend through each of the discrete posts 76, 78, 80, 82 of the second plurality of posts 4 at a relative height thereof. Each of the discrete posts 76, 78, 80, 82 can have a total height, H, as defined by the distance the discrete posts 76, 78, 80, 82 extend in the Z-dimension. In particular embodiments the first member 22 can be positioned along the discrete posts 76, 78, 80, 82 at a height of between 0.3H and 0.7H.

Moreover, in particular embodiments, the discrete posts 76, 78, 80, 82 can be devoid of any other members spanning there between at a height of between 0.01H and 0.3 H and at a height of between 0.7H and 1H. In this regard, the second member 24 can tie the discrete posts 76, 78, 80, 82 of the second plurality of posts 4 together and allow for the transmission and sharing of radial deflection and forces there between. This can enhance the structural integrity of the refractory article 1 and can increase structural stiffness.

As illustrated in FIG. 1, the refractory article 1 can further include a plurality of shoes 52. Each shoe 52 can be positioned at a bottom end of each of the discrete posts 26, 28, 30, 32, and 76, 78, 80, 82 of the first and second plurality of posts 2 and 4.

Figure 5A:
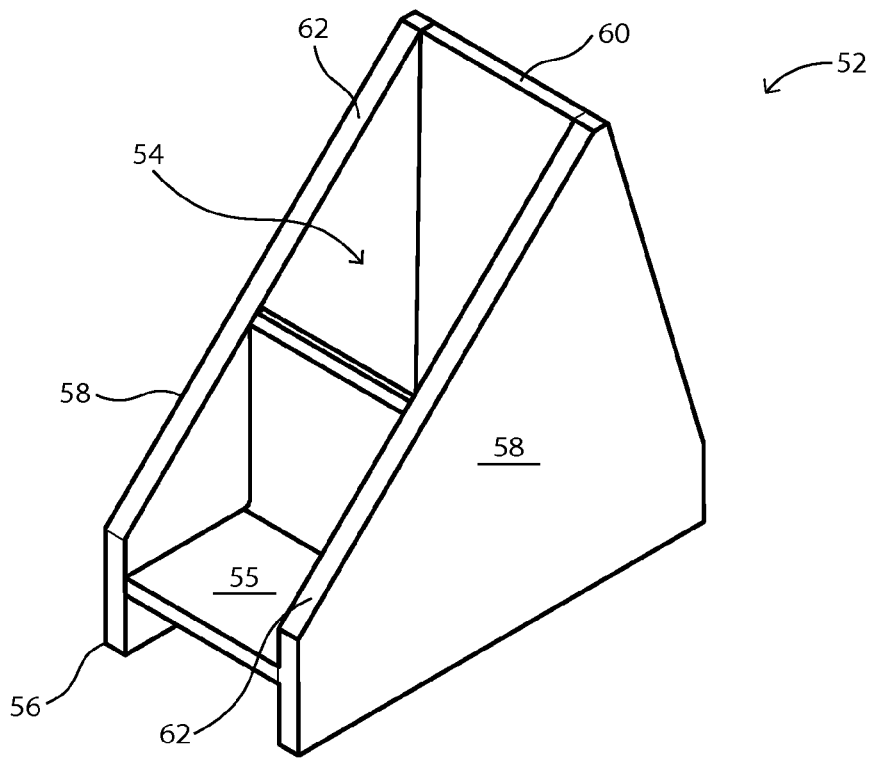
FIG. 5A includes a perspective view of a shoe in accordance with an embodiment.
Figure 5B:
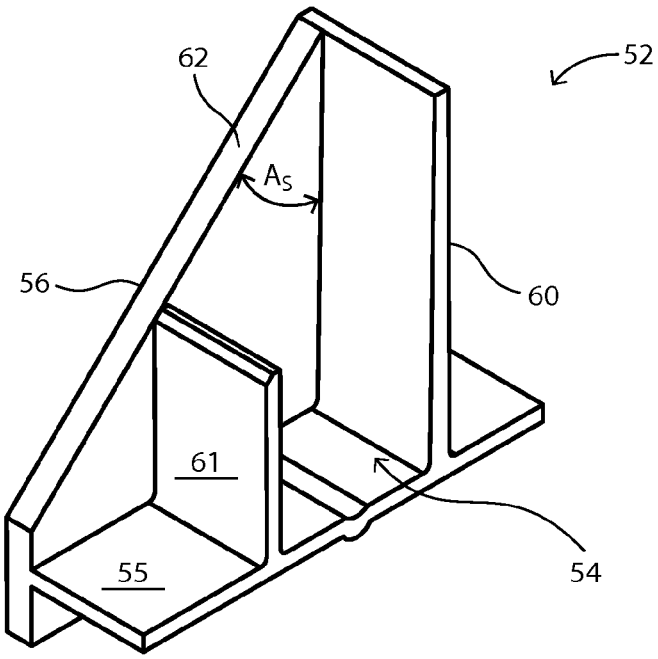
FIG. 5B includes a cross-sectional perspective view of a shoe in accordance with an embodiment.
Figure 6:
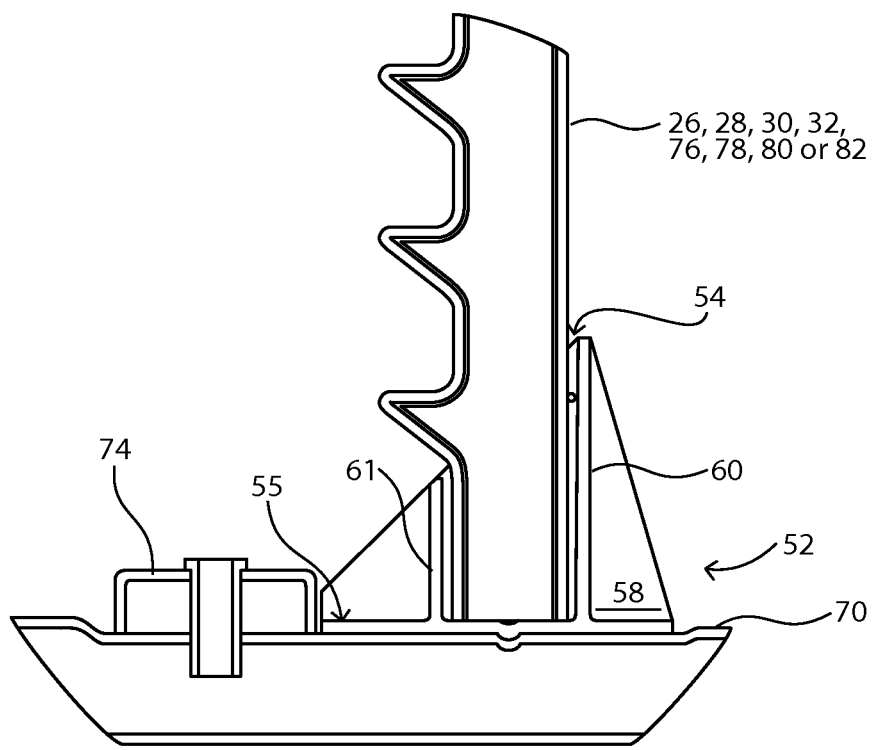
FIG. 6 includes a cross-sectional side view of a post engaged within a shoe in accordance with an embodiment.

As illustrated in FIGS. 5a, 5b, and 6, each shoe 52 can include an inner cavity 54 in which to receive one of the discrete posts 26, 28, 30, 32, and 76, 78, 80, 82 of the first and second plurality of posts 2 and 4. The inner cavity 54 of each shoe 52 can be defined by a body 56 formed from a nitrogen bonded silicon carbide such as N-DURANCE®.

In particular embodiments, the body 56 of each shoe 52 can include at least three side walls two side walls 58 and a back wall 60. In particular embodiments, the body 56 of each shoe 52 can further include a front wall 61 positioned opposite the back wall 60. The walls of the body 56 can be arranged rectilinearly such that when viewed from above, the walls can form a generally rectangular shape.

As seen from a generally side perspective, a top portion 62 of two opposing side walls 58 of each shoe 52 can form an angle, $A_S$, with respect to the back wall 60. In a particular aspect, the angle, $A_S$, formed by the top portion 62 of the each shoe 52 can enhance the rigidity of the shoe 52 while simultaneously minimizing the weight of the shoe 52 by reducing the amount of material required for construction. The angle, $A_S$, can be no greater than 80 degrees, no greater than 75 degrees, no greater than 70 degrees, no greater than 65 degrees, no greater than 60 degrees, no greater than 55 degrees, no greater than 50 degrees, no greater than 45 degrees, or even no greater than 40 degrees. The angle, $A_S$, can be no less than 10 degrees, no less than 15 degrees, no less than 20 degrees, no less than 25 degrees, no less than 30 degrees, or even no less than 35 degrees. Moreover, the angle, $A_S$, can be within a range of between and including any of the values described above, such as, for example, between 45 and 50 degrees.

In particular embodiments, each shoe 52 can further include a lip 55 extending perpendicularly from the front wall 61. The lip 55 can have a distance of no less than 5 mm, such as no less than 10 mm, no less than 15 mm, no less than 20 mm, no less than 30 mm, no less than 40 mm, no less than 50 mm, no less than 75 mm, no less than 100 mm. As will be discussed in more detail below, the lip 55 can provide a support for a member spanning between the first and second plurality of posts 2 and 4.

Each shoe 52 can be formed from a single, monolithic piece or can contain a plurality of pieces that are connected together by welding, adhesive, threaded fasteners, non-threaded fasteners, splines, or any other suitable process for joining members.

In particular embodiments, each one of the shoes 52 can each be substantially identical in composition, size, and geometry. In alternative embodiments, each one of the shoes 52 can have a different relative geometry (e.g., rectangular, triangular, circular, etc.), a different relative size, or be formed from a different material. It should be understood that the inner cavity 54 of each shoe 52 should be sized to receive a single post 26, 28, 30, 32, and 76, 78, 80, 82 devoid of relative perceptible physical play or movement.

In particular embodiments, the side walls 58 and/or the back wall 60 of each shoe 52 can comprise a hole (not shown) corresponding with a matching hole (not shown) located in one of the discrete posts 26, 28, 30, 32, 76, 78, 80, 82. A threaded or non-threaded fastener (not shown) can be positioned through the hole of one of the discrete posts 26, 28, 30, 32, 76, 78, 80, 82 and the hole of the shoe 52 and can be secured in place to reduce or prevent relative movement there between. Alternatively, each one of the discrete posts 26, 28, 30, 32, 76, 78, 80, 82 can form an interference fit with each shoe 52, or be secured thereto by an adhesive, mechanical deformation (e.g., crimping), a weld, or any other similar known method for securing two members.

Figure 7:
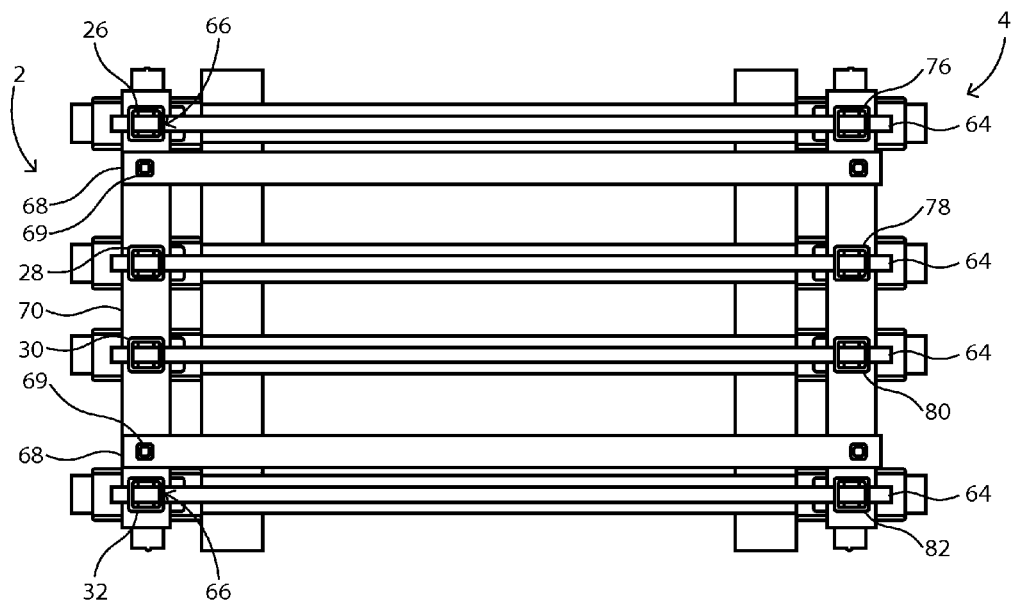
FIG. 7 includes a top view of the top portion of the article of a refractory article in accordance with an embodiment.
Figure 8:
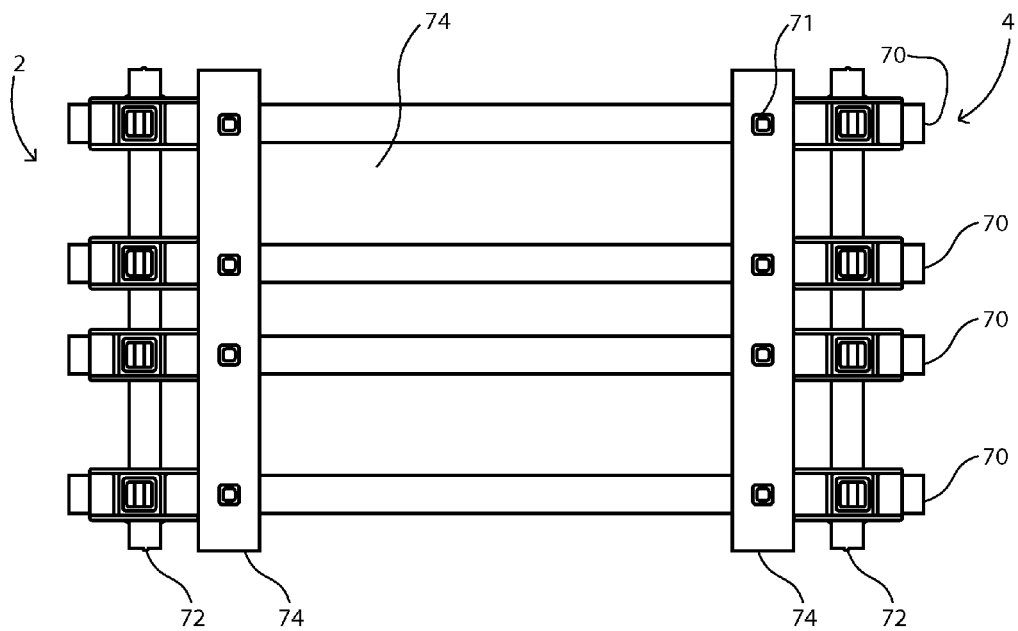
FIG. 8 includes a top view of the bottom portion of the article of a refractory article in accordance with an embodiment.

As shown in FIG. 7, in particular embodiments, the first plurality of posts 2 can be joined to the second plurality of posts 4 at both the upper and lower ends of the refractory article 1. In particular embodiments, the first and second plurality of posts 2 and 4 can be joined by cylindrical members 64. Each of the cylindrical members 64 can have substantially similar dimensional characteristics to that of the first and second members 22 and 24.

Moreover, the cylindrical members 64 can have particular dimensions to facilitate suitable mechanical characteristics of the embodiments herein. For example, each cylindrical member 64 can have a length, $L_{CM}$, as defined by the longest dimension thereof and as extending in the Y-dimension as shown in FIG. 1. In particular embodiments, the length, $L_{CM}$, can be between 1500 mm and 2500 mm. In more particular embodiments, the length, $L_{CM}$, can be between 2000 mm and 2200 mm. In yet more particular embodiments, the cylindrical members 64 can have a length, $L_{CM}$, of between 2030 mm and 2050 mm.

The cylindrical members 64 can also have a diameter, $D_{CM}$. The diameter, $D_{CM}$, can define a dimension of the cylindrical member 64 extending through the body of the cylindrical member 64 in a direction generally perpendicular to the length, $L_{CM}$, such as in the X-dimension as shown in FIG. 1. The diameter may be one dimension used to define the cross-sectional shape of the cylindrical members 64. In particular embodiments, the diameter, $D_{CM}$, can be between 5 mm and 75 mm. In more particular embodiments, the diameter, $D_{CM}$, can be between 35 mm and 45 mm. In yet more particular embodiments, the cylindrical members 64 can have a diameter, $D_{CM}$, of 40 mm.

According to one embodiment, the cylindrical members 64 may have a particular relationship between the length and the diameter to facilitate suitable mechanical characteristics according to the embodiments. For example, the cylindrical member 64 can have a length $L_{CM}$, which can be at least 10 times the length of the diameter (i.e., 10 $D_{CM}$). Yet, in another embodiment the length, $L_{CM}$, can be at least 15 $D_{CM}$, at least 20 $D_{CM}$, at least 25 $D_{CM}$, at least 30 $D_{CM}$, at least 35 $D_{CM}$, at least 40 $D_{CM}$, at least 45 $D_{CM}$, or even at least 50 $D_{CM}$. In particular embodiments, $L_{CM}$ can be no greater than 500 $D_{CM}$, no greater than 450 $D_{CM}$, no greater than 400 $D_{CM}$, no greater than 350 $D_{CM}$, no greater than 300 $D_{CM}$, no greater than 250 $D_{CM}$, no greater than 200 $D_{CM}$, or even no greater than 150 $D_{CM}$. Moreover, in further embodiments, $L_{CM}$ can also be within a range of between and including any of the above described values, such as, for example, between 15 $D_{CM}$ and 25 $D_{CM}$.

The cylindrical members 64 can be formed from a nitrogen bonded silicon carbide, such as, for example, N-DURANCE®, HEXOLOY®, or a combination thereof.

Similar to the first and second members 22 and 24, the cylindrical members 64 can be substantially hollow and can define an internal cavity therein. In this regard, the cylindrical members 64 can provide the refractory article 1 with structural stability while minimizing weight. Specifically, the cylindrical members 64 can have a solid to open ratio of no less than 0.5:1, such as no less than 1:1, or even no less than 1:2. The internal cavity within each of the cylindrical members 64 can define an inner wall that can be polygonal, ellipsoidal, or any combination thereof. Moreover, the internal cavity can extend along the entire length of each of the cylindrical members 64 or any distance thereunder. It should be understood that as contemplated herein the internal cavity of each cylindrical member 64 can vary in size and shape.

The cylindrical members 64 can be positioned substantially near the upper end of the refractory article 1 and can engage one of the discrete posts 26, 28, 30, 32 of the first plurality of posts 2 and a complementary one of the discrete posts 76, 78, 80, 82 of the second plurality of posts 4 (e.g., the first outer post 26 of the first plurality of posts 2 and the first outer post 76 of the second plurality of posts 4). In particular embodiments, the cylindrical members 64 can be positioned along the first and second plurality of posts 2 and 4 at a relative height thereof of between 0.7H and 1H. In more particular embodiments, the cylindrical members 64 can be positioned at a relative height of between 0.90H and 0.99H. In yet more particular embodiments, the cylindrical members 64 can be positioned at a relative height of 0.97H.

Each of the discrete posts 26, 28, 30, 32 in the first plurality of posts 2 can further include a hole 66 extending there through in the Y-dimension as seen in FIG. 1. Each of the holes 66 can be in axial communication with a corresponding hole 66 extending through a complementary one of the discrete posts 76, 78, 80, 82 of the second plurality of posts 4.

The cylindrical members 64 can be sized to fit through a hole 66 in the first plurality of posts 2 and a corresponding hole 66 in the second plurality of posts 4. Similar to the first and second members 22 and 24, the cylindrical members 64 can be sized to overhang beyond the first and second plurality of posts 2 and 4. In this regard, the cylindrical members 64 can be more easily positioned within the refractory article 1 (i.e., an operator can insert the cylindrical members more easily into the holes 66).

In particular embodiments, the cylindrical members 64 can each be secured to a respective post by any method recognizable in the art, such as, for example, by a weld, a threaded fastener, a non-threaded fastener (e.g., a rivet), an adhesive, a tongue and groove or similar complementary engagement structure, mechanical deformation (e.g., crimping), or any combination thereof. In other embodiments, each of the cylindrical members 64 can freely rest within the holes 66. It is noted that the cylindrical members 64 can affect sufficient structural rigidity of the refractory article 1 when secured or non-secured to the respective discrete posts 26, 28, 30, 32, and 76, 78, 80, 82.

In particular embodiments, the refractory article 1 can further include a plurality of rectangular members 68 joining the first and second plurality of posts 2 and 4. As shown in FIG. 7, the rectangular members 68 can each extend between the first and second plurality of posts 2 and 4 and engage thereto by a first pin 69 and a second pins 69. The pins 69 can extend through the rectangular members 68 and secure to the outer discrete posts 26 and 32 of the first plurality of posts 2 and the outer discrete posts 76 and 82 of the second plurality of posts 4.

In particular embodiments, the refractory article 1 can include two rectangular members 68. These rectangular members 68 can be substantially hollow and can increase structural rigidity of the refractory article 1 while minimizing weight thereof. In particular embodiments, the rectangular members 68 can be substantially hollow and can define an internal cavity therein. In this regard, the rectangular members 68 can provide the refractory article 1 with structural stability while minimizing weight. Specifically, the rectangular members 68 can have a solid to open ratio of no less than 0.5:1, such as no less than 1:1, or even no less than 1:2. The internal cavity within each of the rectangular members 68 can define an inner wall that can be polygonal, ellipsoidal, or any combination thereof. Moreover, the internal cavity can extend along the entire length of each of the rectangular members 68 or any distance thereunder. It should be understood that as contemplated herein the internal cavity of each rectangular member can vary in size and shape.

The rectangular members 68 can be formed from a nitrogen bonded silicon carbide, such as, for example, N-DURANCE®, HEXOLOY®, or a combination thereof.

In more preferred embodiments, the rectangular members 68 can be engaged with the first and second plurality of posts 2 and 4 along a first top cross beam 71 and a second top cross beam 73 generally extending in the X-dimension as seen in FIG. 1. The first and second top cross beams 71 and 73 can be positioned along the discrete posts 26, 28, 30, 32 of the first plurality of posts 2 and the discrete posts 76, 78, 80, 82 of the second plurality of posts 4, respectively. Each of the rectangular members 68 can be positioned above the first and second top cross beams 71 and 73 and can be secured to the first and second top cross beams 71 and 73 by one or more pins 69.

The first and second cross beams 71 and 73 may have particular dimensions so as to facilitate suitable mechanical characteristics of the embodiments herein. For example, each of the cross beams 71 and 73 can define a plurality of openings 75 therein. Each one of the discrete posts 26, 28, 30, 32, of the first plurality of posts 2 can be inserted into one of the plurality of openings 75 of the first cross beam 71. Each discrete post 26, 28, 30, 32 can be attached within the opening 75 by a weld, a threaded fastener, a non-threaded fastener (e.g., a rivet), an adhesive, a tongue and groove or similar complementary engagement structure, mechanical deformation (e.g., crimping), or any combination thereof.

Similarly, each one of the discrete posts 76, 78, 80, 82 of the second plurality of posts 4 can be inserted into one of the plurality of openings 75 of the second cross beam 73. Each discrete post 76, 78, 80, 82 can be attached within the opening 75 by a weld, a threaded fastener, a non-threaded fastener (e.g., a rivet), an adhesive, a tongue and groove or similar complementary engagement structure, mechanical deformation (e.g., crimping), or any combination thereof.

In particular embodiments, the first and second cross beams 71 and 73 can be positioned along the first and second plurality of posts 2 and 4, respectively, at a relative height thereof of between 0.7H and 1H. In more particular embodiments, the first and second cross beams 71 and 73 can be positioned at a relative height of between 0.85H and 0.95H. In yet more particular embodiments, the first and second cross beams 71 and 73 can be positioned at a relative height of 0.95H.

In alternative embodiments, the first and second cross beams 71 and 73 can be positioned vertically adjacent to the cylindrical members 64. In this regard, the first and second cross beams 71 and 73 can be positioned immediately above or below the cylindrical members 64. In particular embodiments, the first and second cross beams 71 and 73 can be positioned immediately below the cylindrical members 64.

As seen in FIG. 6, the refractory article 1 can further include a plurality of support members 70 and bottom braces 72. The support members 70 can extend between the first and second plurality of posts 2 and 4. In particular embodiments, each support member 70 can span between the lip 55 of a first shoe 52 of one of the discrete posts 26, 28, 30, 32, of the first plurality of posts 2 and the lip 55 of a second shoe 52 of one of the discrete posts 76, 78, 80, 82 of the second plurality of posts 4. Each one of the support members 70 can be secured to the lip 55 of the respective shoe 52. Alternatively, each one of the support members 70 can rest on the lip 55 of the shoe 52 without being secured thereto.

Each support member 70 may have particular dimensions so as to facilitate suitable mechanical characteristics of the embodiments herein. For example, each support member 70 can have a length, $L_{SM}$, extending in the Y-dimension of between 1800 mm and 2500 mm. In more particular embodiments, $L_{SM}$ can be between 2200 mm and 2300 mm. In yet more particular embodiments, $L_{SM}$ can be 2250 mm.

Each of the support members 70 can comprise a diameter, $D_{SM}$, as measured from opposite outer sidewalls thereof in the X- and Z-dimensions. In particular embodiments, each of the support members 70 can have a diameter, $D_{SM}$, of between 50 mm and 150 mm. In more particular embodiments, each of the support members 70 can have a diameter, $D_{SM}$, of between 90 mm and 110 mm. In yet more particular embodiments, each of the support members 70 can have a diameter, $D_{SM}$, of 100 mm. In certain embodiments, each of the support members 70 can have an equal diameter, $D_{SM}$, in both the X- and Z-dimensions.

In particular embodiments, the refractory article 1 can include four support members 70. In particular embodiments, the four support members 70 can be joined by a plurality of ties 74 extending perpendicular to the support members 70. The ties 74 can contain recessed grooves allowing it to embed with the support members 70. The ties 74 can be secured to the support members 70 by pins 71.

Positioned below the support members 70 can be positioned the bottom braces 72. The bottom braces 72 can be secured to the support members 70 by a weld, a threaded fastener, a non-threaded fastener (e.g., a rivet), an adhesive, a tongue and groove or similar complementary engagement structure, mechanical deformation (e.g., crimping), or any combination thereof.

The bottom braces 72 can have a length, $L_{BB}$, extending in the X-dimension of between 1000 mm and 1500 mm. In more particular embodiments, $L_{BB}$ can be between 1200 and 1300 mm. In yet more particular embodiments, $L_{BB}$ can be 1270 mm.

Each of the bottom braces 72 can comprise a diameter, $D_{BB}$, as measured from opposite outer sidewalls thereof in the Y- and Z-dimensions. In particular embodiments, each of the bottom braces 72 can have a diameter, $D_{BB}$, of between 50 mm and 150 mm. In more particular embodiments, each of the bottom braces 72 can have a diameter, $D_{BB}$, of between 70 mm and 90 mm. In yet more particular embodiments, each of the bottom braces can have a diameter, $D_{BB}$, of 80 mm. In certain embodiments, each of the bottom braces can have an equal diameter, $D_{BB}$, in both the Y- and Z-dimensions The cross support members 70, the bottom braces 72, and the ties 74 can all be formed from a nitrogen bonded silicon carbide, such as, for example, N-DURANCE®, HEXOLOY®, or any combination thereof.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A refractory article, comprising:
a support structure comprising:
a first plurality of posts coupled by a first member; and
a second plurality of posts substantially parallel with the first plurality of posts, the second plurality of posts coupled by a second member,
wherein the support structure has a height, H, and wherein the first and second members are positioned between 0.3H and 0.7H.

Item 2. A refractory article, comprising:
a support structure comprising:
a first plurality of posts coupled by a first member; and
a second plurality of posts substantially parallel with the first plurality of posts, the second plurality of posts coupled by a second member,
wherein the support structure has a height to width ratio of at least 1.5, wherein the support structure has a stiffness factor of no greater than 100 mm, and wherein the support structure has a solid to open volume ratio of no greater than 5%.

Item 3. A refractory article, comprising:
a support structure comprising:
a first plurality of posts coupled by a first member; and
a second plurality of posts substantially parallel with the first plurality of posts, the second plurality of posts coupled by a second member,
wherein the support structure has a weight of no greater than 1200 kg, wherein the support structure has a stiffness factor of no greater than 100 mm, and wherein the support structure has a solid to open volume ratio of no greater than 5%.

Item 4. The refractory article according to any one of the preceding items, wherein each of the first and second members extend in a substantially horizontal direction.

Item 5. The refractory article according to any one of the preceding items, wherein each of the first and second members extend in a substantially horizontal direction and at an angle substantially perpendicular to a direction of the first and second plurality of posts.

Item 6. The refractory article according to any one of the preceding items, wherein each of the first and second members is generally cylindrical.

Item 7. The refractory article according to any one of the preceding items, wherein each of the first and second members is generally hollow.

Item 8. The refractory article according to any one of the preceding items, wherein each of the first and second members comprises a monolithic piece.

Item 9. The refractory article according to any one of the preceding items, wherein the first and second members have identical geometric dimensions.

Item 10. The refractory article according to any one of the preceding items, wherein the first and second plurality of posts extend in substantially vertical direction.

Item 11. The refractory article according to any one of the preceding items, wherein the first and second plurality of posts are vertical.

Item 12. The refractory article according to any one of the preceding items, wherein the first and second plurality of posts are substantially parallel.

Item 13. The refractory article according to any one of the preceding items, wherein the first and second plurality of posts have a generally rectilinear cross-sectional profile.

Item 14. The refractory article according to any one of the preceding items, wherein the first and second plurality of posts are generally hollow.

Item 15. The refractory article according to any one of the preceding items, wherein each of the first and second plurality of posts comprises a monolithic piece.

Item 16. The refractory article according to any one of the preceding items, wherein the first and second plurality of posts have identical geometric dimensions.

Item 17. The refractory article according to any one of the preceding items, wherein each of the first and second plurality of posts comprises:
a first outer post;
a first inner post;
a second inner post; and
a second outer post,
wherein the first outer post, the first inner post, the second inner post, and the second outer post are positioned in adjacent alignment.

Item 18. The refractory article according to item 17, further comprising a plurality of support shoes, wherein each one of the first outer post, the first inner post, the second inner post, and the second outer post of the first and second plurality of posts engages with one of the plurality of support shoes.

Item 19. The refractory article according to item 18, wherein each one of the plurality of support shoes comprises a rectilinear body having four vertical side walls defining an internal cavity to receive one of the posts.

Item 20. The refractory article according to item 19, wherein a top portion of two opposing side walls form an angle, $A_S$, with respect to the vertical side walls, and wherein $A_S$ is no greater than 80 degrees, no greater than 75 degrees, no greater than 70 degrees, no greater than 65 degrees, no greater than 60 degrees, no greater than 55 degrees, no greater than 50 degrees, no greater than 45 degrees, no greater than 40 degrees.

Item 21. The refractory article according to item 20, wherein $A_S$ is no less than 10 degrees, no less than 15 degrees, no less than 20 degrees, no less than 25 degrees, no less than 30 degrees, no less than 35 degrees.

Item 22. The refractory article according to any one of the preceding items, wherein the first and second members have a diameter, $D_M$, wherein the first and second plurality of posts have a diameter, $D_P$, and wherein $D_M$ is less than $D_P$.

Item 23. The refractory article according to item 22, wherein $D_M$ is less than 0.95 $D_P$, such as less than 0.90 $D_P$, less than 0.85 $D_P$, less than 0.80 $D_P$, less than 0.75 $D_P$, less than 0.70 $D_P$, less than 0.65 $D_P$, less than 0.60 $D_P$, less than 0.50 $D_P$, or less than 0.40 $D_P$.

Item 24. The refractory article according to any one of items 22 or 23, wherein $D_P$ is no less than 0.10 $D_M$, such as no less than 0.15 $D_M$, no less than 0.20 $D_M$, or no less than 0.30 $D_M$.

Item 25. The refractory article according to any one of the preceding items, wherein the first and second members have a length, $L_M$, wherein the first and second plurality of posts have a length, $L_P$, and wherein $L_P$ is no less than $L_M$.

Item 26. The refractory article according to item 25, wherein $L_P$ is no less than 1.1 $L_M$, such as no less than 1.2 $L_M$, no less than 1.3 $L_M$, no less than 1.4 $L_M$, no less than 1.5 $L_M$, no less than 2.0 $L_M$, or no less than 2.5 $L_M$.

Item 27. The refractory article according to any one of items 25 or 26, wherein $L_P$ is no greater than 4.0 $L_M$, such as no greater than 3.75 $L_M$, no greater than 3.5 $L_M$, or no greater than 3.25 $L_M$.

Item 28. The refractory article according to any one of the preceding items, wherein the first member engages each of the first plurality of posts at the same relative height, and wherein the second member engages each of the second plurality of posts at the same relative height.

Item 29. The refractory article according to any one of the preceding items, wherein each one of the first and second plurality of posts further comprises a plurality of notches, the notches protruding from an interior surface of each one of the first and second plurality of posts.

Item 30. The refractory article according to item 29, wherein the notches comprise a surface extending substantially perpendicular to the posts.

Item 31. The refractory article according to any one of items 29 or 30, wherein each one of the first and second plurality of posts comprises at least 2 notches, at least 5 notches, at least 6 notches, at least 7 notches, at least 8 notches, at least 9 notches, at least 10 notches.

Item 32. The refractory article according to any one of items 29-31, wherein each one of the first and second plurality of posts comprises no more than 25 notches, no more than 24 notches, no more than 23 notches, no more than 22 notches, no more than 21 notches, no more than 20 notches.

Item 33. The refractory article according to any one of the preceding items, further comprising a plurality of support members extending between the first and second plurality of posts, the support members creating a plurality of support levels in the refractory article.

Item 34. The refractory article according to item 33, wherein each support member is supported by a first notch on one of the first plurality of posts and a second notch on the second plurality of posts, and wherein the first notch and the second notch are positioned at substantially the same vertical height.

Item 35. The refractory article according to any one of items 33 or 34, wherein each support level further comprises a plurality of substantially planar members.

Item 36. The refractory article according to any one of items 33-35, wherein each support level is adapted to support at least 150 Kg, at least 175 Kg, at least 200 Kg, at least 215 Kg, at least 230 Kg.

Item 37. The refractory article according to any one of the preceding items, wherein the members comprise a material having a compressive strength at room temperature of no less than 240 megapascal (MPa), no less than 275 MPa, no less than 300 MPa, no less than 350 MPa, no less than 400 MPa, no less than 450 MPa, no less than 500 MPa, no less than 550 MPa, no less than 600 MPa.

Item 38. The refractory article according to any one of the preceding items, wherein members comprise a material having a modulus of elasticity at room temperature of no less than 300 gigapascals (GPa), no less than 350 GPa, or even no less than 400 GPa Item 39. The refractory article according to any one of the preceding items, wherein the members comprise a material adapted to withstand temperatures of at least 1400° C., at least 1500° C., at least 1600° C., at least 1700° C., at least 1800° C., at least 1900° C.

Item 40. The refractory article according to any one of the preceding items, wherein the members comprise nitrogen bonded silicone carbide.

Item 41. The refractory article according to any one of the preceding items, wherein the members comprise N-DURANCE®.

Item 42. The refractory article according to any one of items 1-40, wherein the members comprise HEXALOY®.

Item 43. The refractory article according to any one of the preceding items, wherein the members comprise a composite of N-DURANCE® and HEXALOY®.

Item 44. The refractory article according to any one of the preceding items, wherein each one of the first and second plurality of posts comprise a material having a compressive strength at room temperature of no less than 240 megapascal (MPa), no less than 275 MPa, no less than 300 MPa, no less than 350 MPa, no less than 400 MPa, no less than 450 MPa, no less than 500 MPa, no less than 550 MPa, no less than 600 MPa.

Item 45. The refractory article according to any one of the preceding items, wherein each one of the first and second plurality of posts comprise a material having a modulus of elasticity at room temperature of no less than 300 gigapascals (GPa), no less than 350 GPa, or even no less than 400 GPa.

Item 46. The refractory article according to any one of the preceding items, wherein the first and second plurality of posts comprise nitrogen bonded silicone carbide.

Item 47. The refractory article according to any one of the preceding items, wherein the first and second plurality of posts comprise N-DURANCE®.

Item 48. The refractory article according to any one of the preceding items, wherein the support structure has a height to width ratio of at least 1.55, at least 1.60, at least 1.65, at least 1.70, at least 1.75, at least 1.80, at least 1.85, at least 1.90, at least 1.95, at least 2.00, at least 2.10, at least 2.20, at least 2.30, at least 2.40, at least 2.50.

Item 49. The refractory article according to any one of the preceding items, wherein the support structure has a height to width ratio of no greater than 4.00, no greater than 3.75, no greater than 3.50, no greater than 3.25, no greater than 3.00, no greater than 2.75, no greater than 2.50.

Item 50. The refractory article according to any one of the preceding items, wherein the support structure has a solid to open volume ratio of no greater than 4.75 percent, no greater than 4.50 percent, no greater than 4.25 percent, no greater than 4.00 percent, no greater than 3.75 percent, no greater than 3.50 percent, no greater than 3.25 percent, no greater than 3.00 percent.

Item 51. The refractory article according to any one of the preceding items, wherein the support structure has a solid to open volume ratio of no less than 1.0 percent, no less than 1.5 percent, no less than 2.0 percent, no less than 2.5 percent, no less than 3.0 percent.

Item 52. The refractory article according to any one of the preceding items, wherein the support structure has a stiffness factor of no greater than 90 mm, no greater than 85 mm, no greater than 80 mm, no greater than 75 mm, no greater than 70 mm, no greater than 75 mm, no greater than 70 mm.

Item 53. The refractory article according to any one of the preceding items, wherein the support structure has a stiffness factor of no less than 5 mm, no less than 10 mm, no less than 15 mm, no less than 20 mm, no less than 25 mm, no less than 30 mm.

Item 54. The refractory article according to any one of the preceding items, wherein the support structure has a height, H, and wherein the first plurality of posts are coupled only by the first member and the second plurality of posts are coupled only by the second member between 0.01H and 0.3H and between 0.7H and 1H.

Item 55. The refractory article according to any one of the preceding items, wherein the first member is disposed within an aperture of the first plurality of posts, wherein the second member is disposed within an aperture of the second plurality of posts, and wherein at least one of the first and second members floats within the aperture of the first or second plurality of posts, respectively

EXAMPLE

The present refractory article 1 can be adapted to provide enhanced stiffness and rigidity during transportation and kiln firing. In this regard, the refractory article 1 can have a stiffness factor as defined by the structure's resistance to deflection or the maximum movement of the structure in response to an applied load. As used herein, the term "stiffness factor" is used to refer to the displacement of the vertical posts in both the X- and Y-dimensions upon the application of a maximum perpendicular force (i.e., the force at which X- and Y-displacement of the vertical posts becomes minimal and further X- and Y-displacement of the posts in the X- and Y-dimensions is reduced to substantially 0 mm).

To determine the stiffness factor, a refractory article is positioned on a Cartesian coordinate system (e.g., a surface with a grid delineating distances) and the position of the four outermost posts is measured and recorded. Each of the outer posts is then acted upon by a perpendicular force until relative movement of the structure becomes minimal and further X- and Y-displacement is reduced to substantially 0 mm. The perpendicular force can be in one of the X and Y directions. At this time, the position of the post being tested is again measured and recorded. The post is then brought back to its initial position on the Cartesian coordinate system and acted upon by a perpendicular force in the opposite direction (i.e., 180° offset from the first perpendicular force). The position of the post is again measured. The post is then brought back to its initial position on the Cartesian coordinate system and acted upon in the other of the X and Y directions. The position of the post is again measured and recorded. The post is then brought back to its initial position on the Cartesian coordinate system and acted upon by a perpendicular force in the opposite direction (i.e., 180° offset from the first force in the second direction). This process is repeated for all four posts.

Sample 1 includes a refractory article in accordance with the present description. Sample 2 includes a refractory article in accordance with the present description devoid of the first and second members 22 or 24 and cylindrical members 64. The results of the above described testing are illustrated in Table 1.

TABLE 1

| Post | Direction | Sample 1 Average (mm) | Sample 2 Average (mm) |
|---|---|---|---|
| 1 | X | 66 | 94 |
|   | Y | 69 | 103.5 |
| 2 | X | 66.5 | — |
|   | Y | 71.5 | — |
| 3 | X | 66.5 | — |
| 4 | X | 65 | 87.5 |
| Average of Averages | | 67.42 | 95.00 |

Certain testing data for Sample 2 is not illustrated in Table 1 as the sample being tested exhibited no relative perceptible termination of deflection of less than 105 mm upon application of a perpendicular force, and thus no measurable distance of maximum deflection.

As illustrated in Table 1, a refractory article 1 in accordance with this description (Sample 1) has an average stiffness factor of 67.42 mm. Conversely, a similar sized refractory article devoid of first and second members 22 and 24 and cylindrical members 64 (Sample 2) exhibited an average stiffness factor of 95.00 mm upon application of substantially identical perpendicular forces. In this regard, Sample 1 is 30% stiffer than a similarly shaped refractory article devoid of first and second members 22 and 24 and cylindrical members 64.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A refractory article, comprising:
   a support structure comprising:
   a first plurality of posts coupled by a first member, wherein each of the first plurality of posts comprises a through aperture, wherein the through apertures of the first plurality of posts are coaxially aligned, and wherein the first member is a monolithic piece that extends through each of the through apertures of the first plurality of posts; and a second plurality of posts substantially parallel with the first plurality of posts, wherein the second plurality of posts are coupled by a second member, each of the second plurality of posts comprises a through aperture and the through apertures of the second plurality of posts are coaxially aligned, wherein the second member is a monolithic piece that extends through each of the through apertures of the second plurality of posts; and a plurality of support members extending between the first and second plurality of posts, wherein the plurality of support members create a plurality of support levels in the support structure, wherein each one of the first and second plurality of posts comprises a plurality of protrusions that extend from a surface of each respective post, and each support member is supported by a protrusion extending from one of the first plurality of posts and a protrusion extending from one of the second plurality of posts, wherein:
the support structure has a height to width ratio of at least 1.5;
the support structure has a solid to open volume ratio of no greater than 5%; and
at least one of the first and second members is not secured to the through apertures of the first or second plurality of posts and is configured to move freely in a longitudinal direction.

2. The refractory article according to claim 1, wherein the support structure has a height, H, and wherein the first and second members are positioned between 0.3H and 0.7H.

3. The refractory article according to claim 1, wherein the first and second members are each generally cylindrical and generally hollow.

4. The refractory article according to claim 1, wherein the first and second members have a diameter, $D_M$, wherein the first and second plurality of posts have a width, $D_P$, and wherein $D_M$ is less than $D_P$.

5. The refractory article according to claim 1, further comprising:
a plurality of support shoes,
wherein each one of the first plurality and the second plurality of posts engages with one of the plurality of support shoes.

6. The refractory article according to claim 5, wherein each one of the plurality of support shoes comprises a rectilinear body having four vertical side walls defining an internal cavity to receive one of the posts, and wherein a top portion of two opposing side walls define an angle, $A_S$, with respect to the vertical side walls, and wherein $A_S$ is no greater than 80 degrees.

7. The refractory article according to claim 1, wherein the plurality of support members are supported by the plurality of protrusions of the first and second plurality of posts.

8. The refractory article according to claim 1, wherein the plurality of support members are spaced apart from the first member and the second member.

9. The refractory article according to claim 1, wherein the support structure has a height to width ratio of at least 1.55 and no greater than 4.

10. The refractory article according to claim 1, wherein neither of the first and second members are secured to the through apertures of the first or second plurality of posts, and both of the first and second member are configured to move freely in a longitudinal direction.

11. The refractory article according to claim 1, wherein:
the first and second plurality of posts both comprise:
a first outer post;
a first inner post;
a second inner post; and
a second outer post,
wherein the first outer post, the first inner post, the second inner post, and the second outer post of the first plurality of posts are positioned in adjacent alignment;
wherein the first outer post, the first inner post, the second inner post, and the second outer post of the second plurality of posts are positioned in adjacent alignment; and
wherein the first and second members are configured to tie together the first outer post, the first inner post, the second inner post, and the second outer post of the first and second plurality of posts, respectively.

12. The refractory article according to claims 1, wherein the first and second members comprise a nitrogen bonded silicon carbide.

13. The refractory article according to claim 1, wherein each of the first and second members extend at an angle substantially perpendicular to the first and second plurality of posts.

14. The refractory article according to claim 1 wherein each support member is supported by an upper surface of one of the plurality of protrusions of the first plurality of posts and an upper surface of one of the plurality of protrusions of the second plurality of posts.

15. The refractory article according to claim 14, wherein each of the upper surfaces are substantially perpendicular to the posts.

16. The refractory article of claim 1, wherein each of the first and second members extend in a substantially horizontal direction.

17. The refractory article according to claim 1, wherein the support structure further comprises a plurality of third members, each of the plurality of third members coupling one of the first plurality of posts and one of the second plurality of posts.

18. The refractory article according to claim 17, wherein the plurality of third members are positioned at a relative height between 0.7H and 1H of a height, H, of the support structure.

19. The refractory article according to claim 1, wherein the first and second members have a length, $L_M$, wherein the first and second plurality of posts have a length, $L_P$, and wherein $L_P$ is no less than $L_M$.

20. The refractory article according to claim 17, wherein each of the plurality of the third members are disposed within an aperture of one of the first plurality of posts and within an aperture of one of the second plurality of posts.

* * * * *